US010663555B2

(12) United States Patent
Mayuzumi et al.

(10) Patent No.: US 10,663,555 B2
(45) Date of Patent: May 26, 2020

(54) COMMUNICATION DEVICE, COMMUNICATION METHOD, AND COMPUTER-READABLE RECORDING MEDIUM

(71) Applicants: Ryusuke Mayuzumi, Tokyo (JP); Masaru Kuroda, Tokyo (JP); Shintaro Kawamura, Kanagawa (JP); Yang Wang, Kanagawa (JP); Hiroki Sugino, Kanagawa (JP)

(72) Inventors: Ryusuke Mayuzumi, Tokyo (JP); Masaru Kuroda, Tokyo (JP); Shintaro Kawamura, Kanagawa (JP); Yang Wang, Kanagawa (JP); Hiroki Sugino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 53 days.

(21) Appl. No.: 15/339,230

(22) Filed: Oct. 31, 2016

(65) Prior Publication Data

US 2017/0127379 A1 May 4, 2017

(30) Foreign Application Priority Data

Nov. 2, 2015 (JP) .................. 2015-215609
Jun. 6, 2016 (JP) .................. 2016-112772

(51) Int. Cl.
*G01S 3/801* (2006.01)
*H04W 48/18* (2009.01)
(Continued)

(52) U.S. Cl.
CPC ............. *G01S 3/801* (2013.01); *H04W 4/021* (2013.01); *H04W 4/80* (2018.02); *H04W 48/18* (2013.01); *H04W 84/12* (2013.01); *H04W 88/06* (2013.01)

(58) Field of Classification Search
CPC combination set(s) only.
See application file for complete search history.

(56) References Cited

U.S. PATENT DOCUMENTS 8,699,725 B2 * 4/2014 Kuzuryu .................. H04R 5/00
381/104
8,861,310 B1 * 10/2014 Karakotsios .......... G01S 3/8083
367/124
(Continued)

FOREIGN PATENT DOCUMENTS

JP 2012-095270 5/2012
JP 2015-023449 2/2015
(Continued)

*Primary Examiner* — Zhiyu Lu
(74) *Attorney, Agent, or Firm* — Oblon, McClelland, Maier & Neustadt, L.L.P.

(57) ABSTRACT

A communication device includes a first communication unit configured to perform communication using a first scheme; a second communication unit configured to perform communication using a second scheme; a first acquirer configured to acquire, through communication using the second scheme, first information that indicates an area that allows communication using the first scheme in a first area for communication using the first scheme; a second acquirer configured to acquire second information that indicates an area that allows communication using the first scheme in an acoustic communication area; a comparator configured to compare the first information with the second information to determine whether a current position is within the area indicated by the first information; and a setupper configured to, when the current position is within the area, perform a process for establishing a communication line in accordance with the first scheme using setup information.

19 Claims, 19 Drawing Sheets

(51) Int. Cl.
  *H04W 4/021* (2018.01)
  *H04W 4/80* (2018.01)
  *H04W 84/12* (2009.01)
  *H04W 88/06* (2009.01)

(56) References Cited

U.S. PATENT DOCUMENTS

| | | | | |
|---|---|---|---|---|
| 9,554,061 | B1* | 1/2017 | Proctor, Jr. | H04N 5/268 |
| 2003/0003866 | A1* | 1/2003 | Overy | G01S 11/16 |
| | | | | 455/41.1 |
| 2004/0003250 | A1* | 1/2004 | Kindberg | G06F 21/445 |
| | | | | 713/171 |
| 2013/0176984 | A1* | 7/2013 | Koezuka | H04W 76/10 |
| | | | | 370/329 |
| 2013/0227703 | A1* | 8/2013 | Sotos | H04L 69/14 |
| | | | | 726/26 |
| 2014/0279122 | A1* | 9/2014 | Luna | G06Q 30/0601 |
| | | | | 705/26.1 |
| 2014/0313858 | A1* | 10/2014 | Price | G01S 3/8083 |
| | | | | 367/127 |
| 2014/0369169 | A1* | 12/2014 | Iida | H04B 11/00 |
| | | | | 367/135 |
| 2015/0024756 | A1 | 1/2015 | Du | |
| 2015/0093990 | A1* | 4/2015 | Lin | H04W 8/005 |
| | | | | 455/41.2 |
| 2015/0141005 | A1* | 5/2015 | Suryavanshi | H04L 67/125 |
| | | | | 455/434 |
| 2015/0172435 | A1* | 6/2015 | Choi | H04M 1/7253 |
| | | | | 455/418 |
| 2015/0230043 | A1* | 8/2015 | Yakir | H04W 76/10 |
| | | | | 455/426.1 |
| 2015/0294362 | A1* | 10/2015 | Royyuru | G06Q 30/0261 |
| | | | | 705/14.58 |
| 2015/0358768 | A1* | 12/2015 | Luna | G01S 11/06 |
| | | | | 455/456.1 |
| 2015/0382198 | A1* | 12/2015 | Kashef | H04L 63/08 |
| | | | | 726/5 |
| 2016/0094979 | A1* | 3/2016 | Naik | H04M 3/42348 |
| | | | | 455/414.1 |
| 2016/0248774 | A1 | 8/2016 | Kawamura et al. | |
| 2016/0249162 | A1 | 8/2016 | Mayuzumi et al. | |
| 2017/0302779 | A1* | 10/2017 | Zhao | H04M 1/72533 |
| 2018/0184349 | A1* | 6/2018 | Gabai | H04W 36/32 |

FOREIGN PATENT DOCUMENTS

| | | |
|---|---|---|
| JP | 2016-158102 | 9/2016 |
| JP | 2016-158103 | 9/2016 |
| JP | 2016-167793 | 9/2016 |
| JP | 2016-167795 | 9/2016 |
| JP | 2016-219997 A | 12/2016 |

* cited by examiner

COMMUNICATION DEVICE, COMMUNICATION METHOD, AND COMPUTER-READABLE RECORDING MEDIUM

CROSS-REFERENCE TO RELATED APPLICATIONS

The present application claims priority under 35 U.S.C. § 119 to Japanese Patent Application No. 2015-215609, filed Nov. 2, 2015 and Japanese Patent Application No. 2016-112772, filed Jun. 6, 2016. The contents of which are incorporated herein by reference in their entirety.

BACKGROUND OF THE INVENTION

1. Field of the Invention

The present invention relates to a communication device, a communication method, and a computer-readable recording medium.

2. Description of the Related Art

Wireless LANs are known today that enable wireless communications by radio waves with remote computers via access points in a network. The LAN is an abbreviation for "local area network". The wireless LAN offers enhanced convenience and is thus widespread. Also widespread is near field communication, such as Bluetooth (registered trademark), having a communication range that is narrower than the communication range of the wireless LAN.

Japanese Unexamined Patent Application Publication No. 2012-095270 discloses a wireless communication system that is intended to limit a range in which communication can be performed within an area over which radio waves used in wireless communication reach. This wireless communication system acquires setup information used for establishing a wireless communication path from an acoustic signal. The wireless communication system cancels the wireless communication line when the acoustic signal is no longer acquired after the wireless communication has been established. This arrangement can limit the wireless communication range within the range over which the acoustic signal reaches.

SUMMARY OF THE INVENTION

According to one aspect of the present invention, a communication device includes a first communication unit, a second communication unit, a first acquirer, a second acquirer, a comparator, and a setupper. The first communication unit is configured to perform communication in accordance with a first communication scheme. The second communication unit is configured to perform communication in accordance with a second communication scheme that is different from the first communication scheme. The first acquirer is configured to acquire, through communication in accordance with the second communication scheme, first area information that indicates an area in which communication in accordance with the first communication scheme is enabled in a first communication area in which communication in accordance with the first communication scheme is performed. The second acquirer is configured to acquire second area information that indicates an area in which communication in accordance with the first communication scheme is enabled in an acoustic communication area. The second area information is an acoustic signal. The comparator is configured to compare the first area information with the second area information to determine whether a current position is within the area indicated by the first area information. The setupper is configured to, when the current position is determined to be within the area indicated by the first area information, perform a setup process for establishing a communication line in accordance with the first communication scheme using setup information for establishing the communication line in accordance with the first communication scheme.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
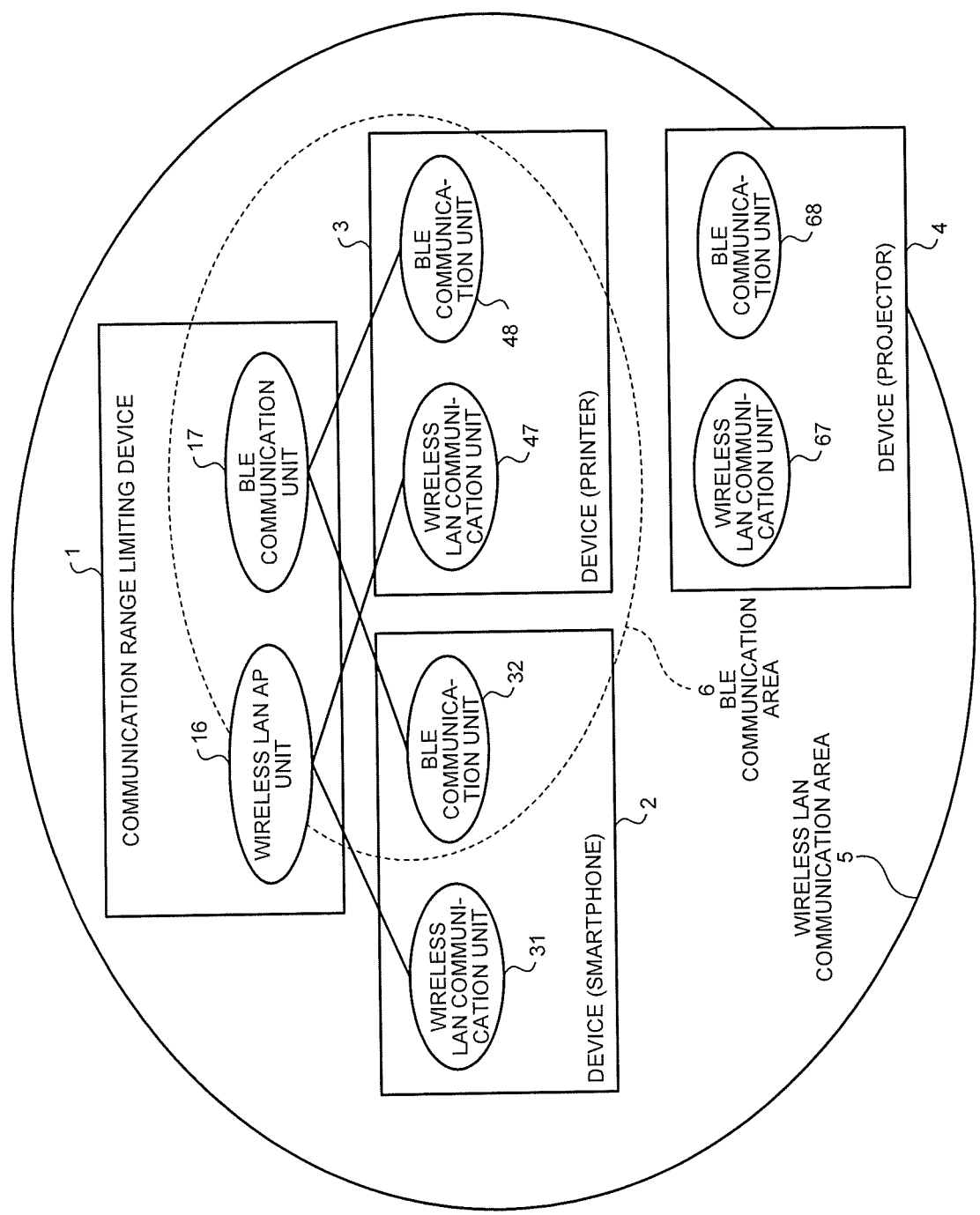
FIG. 1 is a system configuration diagram illustrating a basic configuration of a wireless LAN communication scheme.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

The following details, with reference to the accompanying drawings, a wireless local area network (LAN) communication scheme according to embodiments to which the present invention is applied.

Basic Configuration

The following describes a basic configuration of the wireless LAN communication scheme according to the embodiments to be described hereunder. FIG. 1 is a system configuration diagram illustrating the basic configuration of the wireless LAN communication scheme. As illustrated in FIG. 1, the wireless LAN communication scheme includes a communication range limiting device 1, a smartphone 2 as a first device, a printer device 3 as a second device, and a projector device 4 as a third device. It is noted that each device illustrated in FIG. 1 represents only an example and may be replaced by any other device that has a communication function to be described later. For example, a tablet terminal device, a portable gaming machine, a notebook personal computer, or any other portable communication device may be used in place of the smartphone 2.

Basic Configuration of Communication Range Limiting Device

The communication range limiting device 1 forms an access point for a wireless LAN, such as a wireless LAN router. The communication range limiting device 1 forms, as an exemplary local area network, a wireless LAN communication area 5 indicated by the solid-line ellipse in FIG. 1. The communication range limiting device 1 enables communication of each device only in an area narrower than the wireless LAN communication area 5 within the wireless LAN communication area 5. For example, the communication range limiting device 1 enables communication of each device only in a personal area network (PAN) that is narrower than the wireless LAN communication area 5 within the wireless LAN communication area 5.

Exemplarily, a Bluetooth (registered trademark) PAN that performs Bluetooth (registered trademark) Low Energy (BLE) communication consuming ultra-low electric power may be used as the personal area network. In FIG. 1, a communication range indicated by the dotted-line ellipse is a BLE communication area 6 by the Bluetooth (registered trademark) PAN. The following description assumes that the personal area network is the Bluetooth PAN. Nonetheless, non-contact wireless communication (Near Field Communications (NFC)), milliwave wireless communication, QR code (registered trademark), visible light, environmental sound, and ultrasonic waves may, for example, be used instead of the Bluetooth.

Basic Hardware Configuration of Communication Range Limiting Device

Figure 2:
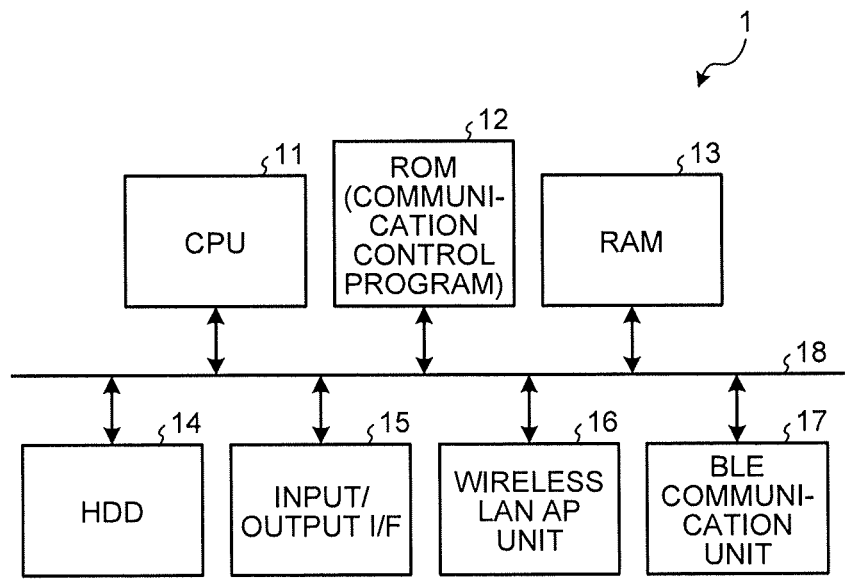
FIG. 2 is a hardware configuration diagram illustrating a communication range limiting device disposed in the wireless LAN communication scheme that is a basic configuration.

FIG. 2 illustrates a basic hardware configuration of the communication range limiting device 1. As illustrated in FIG. 2, the communication range limiting device 1 includes a central processing unit (CPU) 11, a read only memory (ROM) 12, a random access memory (RAM) 13, a hard disk drive (HDD) 14, an input/output interface (input/output I/F) 15, a wireless LAN AP unit 16 (AP stands for access point), and a BLE communication unit 17. The elements from the CPU 11 to the BLE communication unit 17 are connected to each other via a bus line 18.

The ROM 12 stores a communication control program for enabling communication of each device only in the BLE communication area 6 within the wireless LAN communication area 5. The communication control program may be stored in the RAM 13, the HDD 14, or other storage unit. The CPU 11 operates in accordance with the communication control program to thereby control the wireless LAN AP unit 16 and the BLE communication unit 17, controlling to enable communication of each device only in the BLE communication area 6 within the wireless LAN communication area 5.

In FIGS. 1 and 2, the communication range limiting device 1 is illustrated as a standalone device. The communication range limiting device 1 may, however, be incorporated in each device, for example, in a printer device or a multifunction peripheral (MFP).

Basic Hardware Configuration of Smartphone

Figure 3:
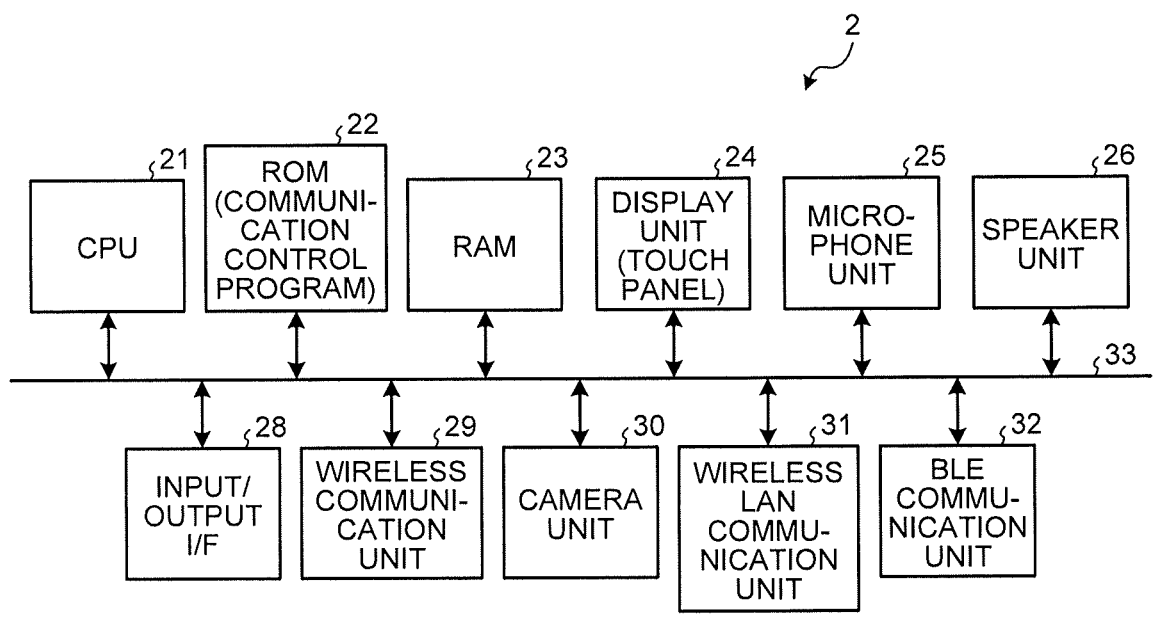
FIG. 3 is a hardware configuration diagram illustrating a smartphone device disposed in the wireless LAN communication scheme that is the basic configuration.

FIG. 3 illustrates a hardware configuration of the smartphone 2. As illustrated in FIG. 3, the smartphone 2 includes a CPU 21, a ROM 22, a RAM 23, a display unit 24, a microphone unit 25, and a speaker unit 26. The smartphone 2 further includes an input/output I/F 28, a wireless communication unit 29, a camera unit 30, a wireless LAN communication unit 31, and a BLE communication unit 32. The elements from the CPU 21 to the BLE communication unit 32 are connected to each other via a bus line 33. The wireless LAN communication unit 31 is an example of the first communication unit. The BLE communication unit 32 is an example of the second communication unit.

The ROM 22 stores a communication control program for enabling communication of each device only in the BLE communication area 6 within the wireless LAN communication area 5. The communication control program may be stored in the RAM 23 or other storage unit. The CPU 21 operates in accordance with the communication control program to thereby control the wireless LAN communication unit 31 and the BLE communication unit 32. The CPU 21 thereby enables BLE communication in the BLE communication area 6 within the wireless LAN communication area 5.

The display unit 24 integrates a touch panel formed of a transparent electrode with a display panel to thereby form what is called a touch panel-mounted display unit. The wireless communication unit 29 performs communication of, for example, telephone and e-mail via a wireless base station operating on a predetermined carrier.

Basic Hardware Configuration of Printer Device

Figure 4:
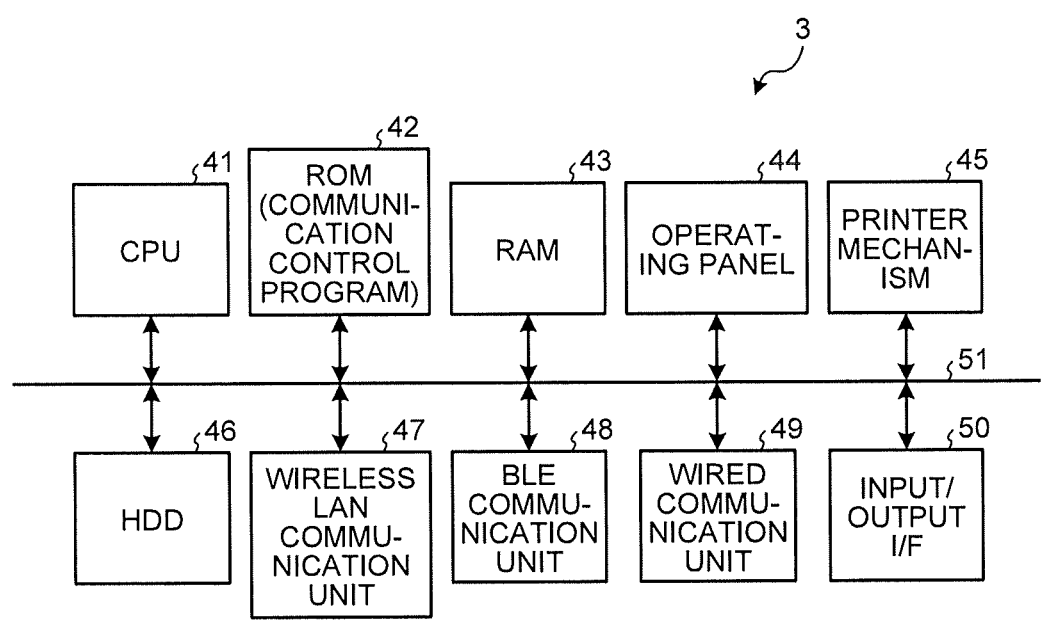
FIG. 4 is a hardware configuration diagram illustrating a printer device disposed in the wireless LAN communication scheme that is the basic configuration.

FIG. 4 illustrates a basic hardware configuration of the printer device 3. As illustrated in FIG. 4, the printer device 3 includes a CPU 41, a ROM 42, a RAM 43, an operating panel 44, and a printer mechanism 45. The printer device 3 further includes an HDD 46, a wireless LAN communication unit 47, a BLE communication unit 48, a wired communication unit 49, and an input/output I/F 50. The elements from the CPU 41 to the input/output I/F 50 are connected to each other via a bus line 51.

The ROM 42 stores a communication control program for enabling communication of each device only in the BLE communication area 6 within the wireless LAN communication area 5. The communication control program may be stored in the RAM 43, the HDD 46, or other storage unit. The CPU 41 operates in accordance with the communication control program to thereby control the wireless LAN communication unit 47 and the BLE communication unit 48. The CPU 41 thereby enables BLE communication in the BLE communication area 6 within the wireless LAN communication area 5. Additionally, the printer mechanism 45 performs printing of, for example, images and texts, in accordance with a print setup specified from the smartphone 2.

Basic Hardware Configuration of Projector Device

Figure 5:
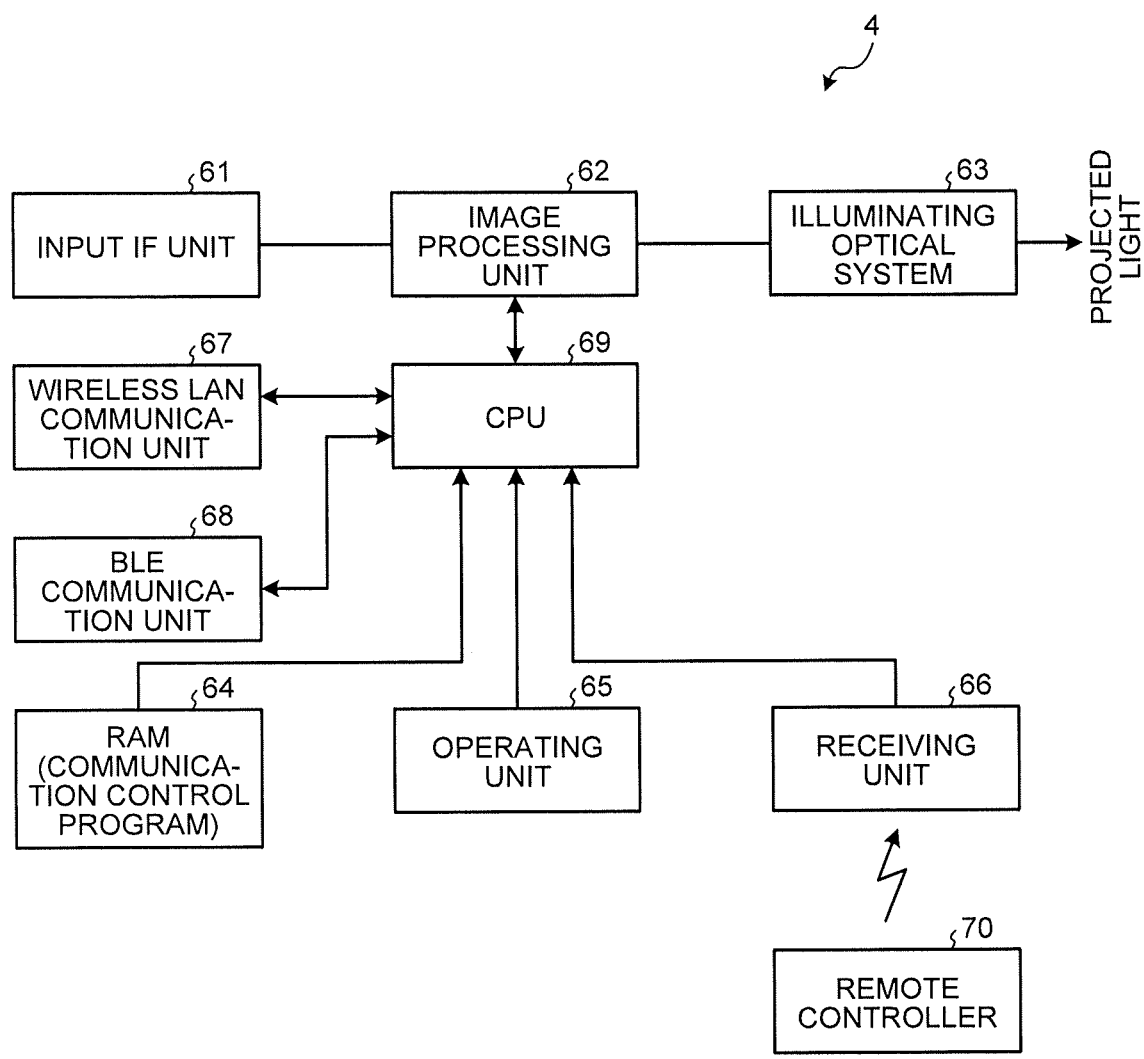
FIG. 5 is a hardware configuration diagram illustrating a projector device disposed in the wireless LAN communication scheme that is the basic configuration.

FIG. 5 illustrates a basic hardware configuration of the projector device 4. As illustrated in FIG. 5, the projector device 4 includes an input interface unit (input IF unit) 61, an image processing unit 62, an illuminating optical system 63, a RAM 64, and an operating unit 65. The projector device 4 further includes a receiving unit 66 that receives commands from a remote controller 70 through infrared communication, a wireless LAN communication unit 67, a BLE communication unit 68, and a CPU 69.

The projector device 4 receives image information that corresponds to a projected image supplied to the input IF unit 61 thereof. The image information is subjected to predetermined image processing including distortion correction performed by the image processing unit 62 before being projected onto, for example, a screen by the illuminating optical system 63.

The RAM 64 stores a communication control program for enabling communication of each device only in the BLE communication area 6 within the wireless LAN communication area 5. The communication control program may be stored in a ROM, a HDD, or other storage unit. The CPU 69 operates in accordance with the communication control program to thereby control the wireless LAN communication unit 67 and the BLE communication unit 68. The CPU 69 thereby enables BLE communication in the BLE communication area 6 within the wireless LAN communication area 5.

Basic Software Configuration of Communication Range Limiting Device

Figure 6:
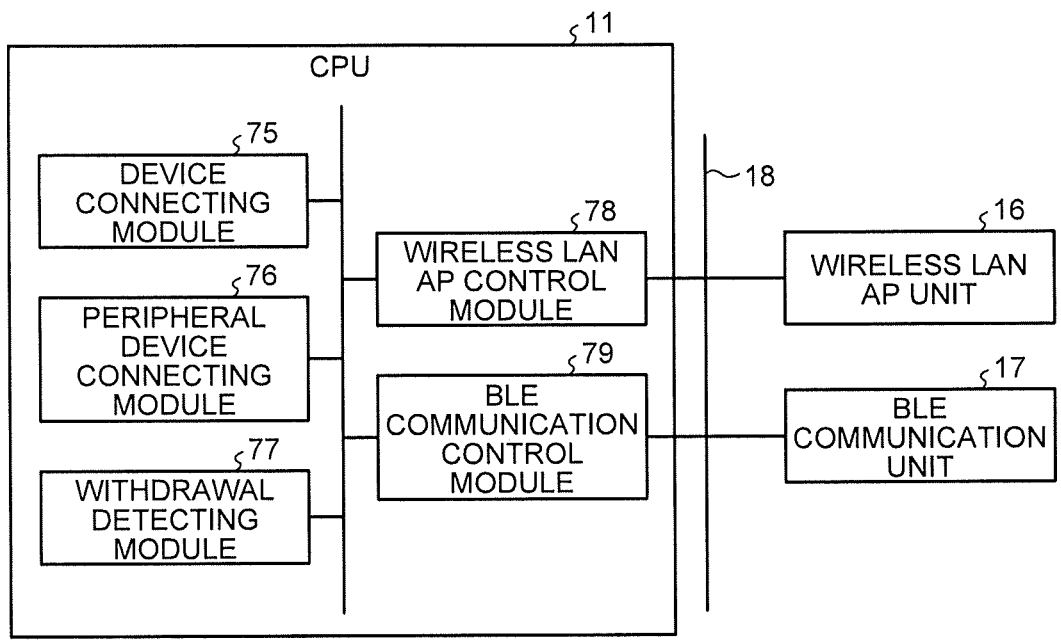
FIG. 6 is a functional block diagram of the communication range limiting device disposed in the wireless LAN communication scheme that is the basic configuration.

FIG. 6 is a block diagram illustrating functions achieved by the CPU 11 of the communication range limiting device 1 when the CPU 11 operates in accordance with the communication control program. As illustrated in FIG. 6, the CPU 11 of the communication range limiting device 1 executes the communication control program to thereby function as a device connecting module 75, a peripheral device connecting module 76, a withdrawal detecting module 77, a wireless LAN AP control module 78, and a BLE communication control module 79.

It is noted that the following description of this example assumes that the elements from the device connecting module 75 to the BLE communication control module 79 are achieved as software functions by the communication control program. The elements from the device connecting module 75 to the BLE communication control module 79 may nonetheless be achieved in part or in whole by hardware such as an integrated circuit (IC).

The communication control program of the communication range limiting device 1 may be recorded and provided in a computer-readable recording medium such as a CD-ROM and a flexible disk (FD) as an installable or executable file. The communication control program of the communication range limiting device 1 may even be recorded and provided in a computer-readable recording medium such as a CD-R, a digital versatile disk (DVD), a Blu-ray disc (registered trademark), and a semiconductor memory. The communication control program of the communication range limiting device 1 may still be provided by being installed via a network such as the Internet. The communication control program of the communication range limiting device 1 may still be embedded and provided in a ROM of a device, for example.

Basic Software Configuration of Smartphone

Figure 7:
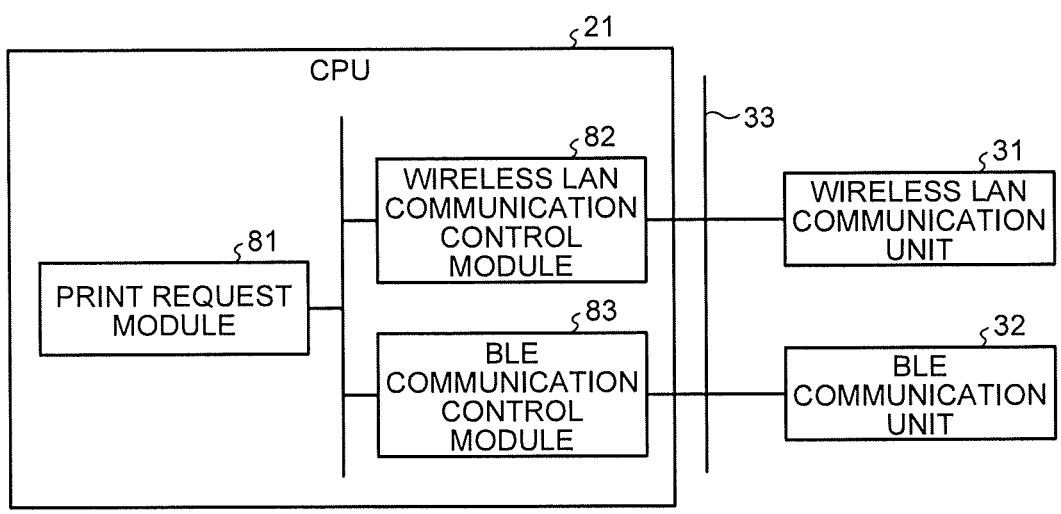
FIG. 7 is a functional block diagram of the smartphone disposed in the wireless LAN communication scheme that is the basic configuration.

FIG. 7 is a block diagram illustrating functions achieved by the CPU 21 of the smartphone 2 when the CPU 21 operates in accordance with the communication control program. As illustrated in FIG. 7, the CPU 21 of the smartphone 2 operates in accordance with the communication control program to thereby function as a print request module 81, a wireless LAN communication control module 82 (an example of the first communication control module), and a BLE communication control module 83 (an example of the first communication control module). The print request module 81 achieves a function of remotely operating the printer device 3 through BLE communication to thereby cause the printer device 3 to print a desired image or text, for example.

It is noted that the following description of this example assumes that the elements from the print request module 81 to the BLE communication control module 83 are achieved as software functions by the communication control program. The elements from print request module 81 to the BLE communication control module 83 may nonetheless be achieved in part or in whole by an integrated circuit (IC) or by hardware.

The communication control program of the smartphone 2 may be recorded and provided in a computer-readable recording medium such as a CD-ROM and a flexible disk (FD) as an installable or executable file. The communication control program of the smartphone 2 may even be recorded and provided in a computer-readable recording medium such as a CD-R, a digital versatile disk (DVD), a Blu-ray disc (registered trademark), and a semiconductor memory. The communication control program of the smartphone 2 may still be provided by being installed via a network such as the Internet. The communication control program of the smartphone 2 may still be embedded and provided in a ROM of a device, for example.

Basic Software Configuration of Printer Device

Figure 8:
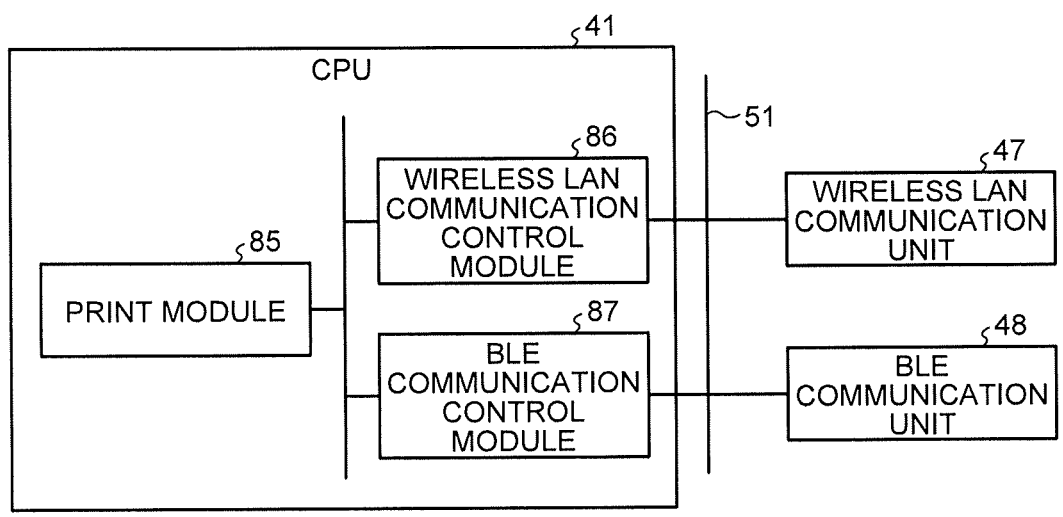
FIG. 8 is a functional block diagram of the printer device disposed in the wireless LAN communication scheme that is the basic configuration.

FIG. 8 is a block diagram illustrating functions achieved by the CPU 41 of the printer device 3 when the CPU 41 operates in accordance with the communication control program. As illustrated in FIG. 8, the CPU 41 of the printer device 3 operates in accordance with the communication control program to thereby function as a print module 85, a wireless LAN communication control module 86, and a BLE communication control module 87. The print module 85 achieves a function to control the printer mechanism 45 to print an image, text, or the like requested by the smartphone 2.

It is noted that the following description of this example assumes that the elements from the print module 85 to the BLE communication control module 87 are achieved as software functions. The elements from print module 85 to the BLE communication control module 87 may nonetheless be achieved in part or in whole by an integrated circuit (IC) or by hardware.

The communication control program of the printer device 3 may be recorded and provided in a computer-readable recording medium such as a CD-ROM and a flexible disk (FD) as an installable or executable file. The communication control program of the printer device 3 may even be recorded and provided in a computer-readable recording medium such as a CD-R, a DVD, a Blu-ray disc (registered trademark), and a semiconductor memory. The communication control program of the printer device 3 may still be provided by being installed via a network such as the Internet. The communication control program of the printer device 3 may still be embedded and provided in a ROM of a device, for example.

Outline of Basic Operations of Wireless LAN Communication Scheme

In the wireless LAN communication scheme, the outer ellipse indicated by the solid line in FIG. 1 represents a wireless LAN communication-enabled range (the wireless LAN communication area 5) formed by the wireless LAN AP unit 16 of the communication range limiting device 1. The smartphone 2, the printer device 3, and the projector device 4 are disposed inside this wireless LAN communication area 5.

The smartphone 2 communicates with the printer device 3, the projector device 4, and other peripheral devices having the wireless LAN communication function to thereby be capable of remote control of, for example, printing of a desired image, text, or the like and projection of an image or the like via the wireless LAN.

The printer device 3, the projector device 4, and other peripheral devices include the wireless LAN communication units 47 and 67 and the BLE communication units 48 and 68. This arrangement enables BLE communication with the BLE communication unit 17 of the communication range limiting device 1. As indicated by the dotted-line ellipse in FIG. 1, however, the BLE communication area 6 is narrower than the wireless LAN communication area 5. Thus, whereas the BLE communication is enabled between each of the smartphone 2 and the printer device 3 that are disposed inside the BLE communication area 6, and the communication range limiting device 1, the BLE communication is disabled between the projector device 4 disposed outside the BLE communication area 6 and the communication range limiting device 1.

Specifically, the wireless LAN communication scheme performs the wireless LAN setup through the BLE communication as will be described later. As a result, only the smartphone 2 and the printer device 3 that are capable of the BLE communication can actually perform communication using the wireless LAN. The wireless LAN setup cannot be performed for the projector device 4 that is incapable of the BLE communication, even though the projector device 4 is disposed inside the wireless LAN communication area 5, so that the wireless LAN communication is disabled with the projector device 4.

Basic Connection Operation with Respect to Smartphone

Figure 9:
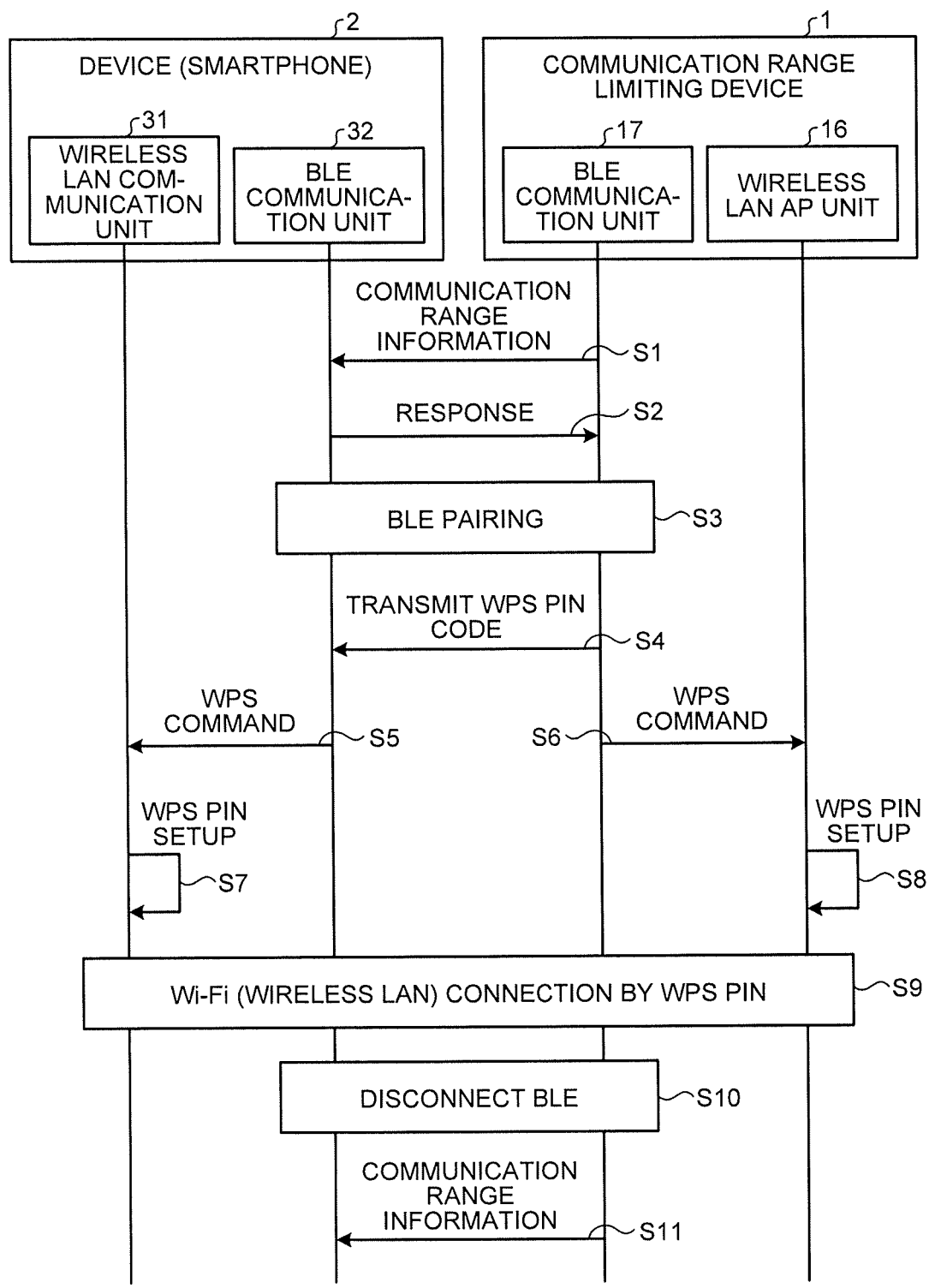
FIG. 9 is a sequence diagram illustrating that a smartphone that has moved into a BLE communication area within a wireless LAN communication area establishes a wireless LAN communication line in the wireless LAN communication scheme that is the basic configuration.

FIG. 9 is a sequence diagram illustrating that the smartphone 2 that has moved into the BLE communication area 6 within the wireless LAN communication area 5 establishes a wireless LAN communication line. The device connecting module 75 of the communication range limiting device 1 transmits, for example, an advertisement packet through three advertisement channels from the BLE communication control module 79 via the BLE communication unit 17 to thereby notify a peripheral device of presence of the communication range limiting device. The advertisement packet includes communication range information that indicates the BLE communication area 6. Step S1 denotes the transmission of the advertisement packet including the communication range information that indicates the BLE communication area 6.

When the smartphone 2 is located within the BLE communication area 6, the BLE communication unit 32 of the smartphone 2 receives the advertisement packet (the communication range information) that has been transmitted from the communication range limiting device 1. By referring to the received communication range information, the smartphone 2 determines whether the smartphone 2 is located within the BLE communication area 6. A result of this determination is transmitted to the communication range limiting device 1 through the BLE communication as a response denoted by Step S2. If the smartphone 2 is located within the BLE communication area 6, the BLE communication unit 32 of the smartphone 2 and the BLE communication unit 17 of the communication range limiting device 1 perform pairing for the BLE communication (BLE pairing) at Step S3. The BLE pairing enables the BLE communication between the smartphone 2 and the communication range limiting device 1.

When the BLE pairing is completed, the device connecting module 75 of the communication range limiting device 1 uses the BLE communication to transmit to the smartphone 2 at Step S4 a PIN code (unique identification information) of the WPS system that facilitates wireless LAN connection and is standardized by Wi-Fi Alliance. Additionally, the device connecting module 75 of the communication range limiting device 1 transfers to the wireless LAN AP unit 16, at Step S6, the PIN code that has been transmitted to the smartphone 2, thereby issuing a command to prepare for starting communication by the WPS system. The wireless LAN AP unit 16 of the communication range limiting device 1 performs setup for the WPS system using the PIN code transmitted to the smartphone 2 at Step S8.

The BLE communication unit 32 of the smartphone 2, having received the PIN code of the WPS system from the communication range limiting device 1, transfers at Step S5 the received PIN code to the wireless LAN communication unit 31, thereby issuing a command to prepare for starting communication by the WPS system. At Step S7, the wireless LAN communication unit 31 performs setup for the WPS system using the PIN code transferred from the communication range limiting device 1. This establishes Wi-Fi connection (wireless LAN connection) between the smartphone 2 and the communication range limiting device 1 by the WPS system through the use of the PIN code.

As described above, the wireless LAN communication scheme automatically completes the Wi-Fi connection (wireless LAN connection) when the smartphone 2 is located within the BLE communication area 6 of the communication range limiting device 1. This automatic connection establishment relieves the user of setup knowledge about the wireless LAN and a troublesome operation to input the PIN code. In addition, encrypted information is transmitted and received among different devices in BLE communication, so that the PIN code can be transmitted and received with security.

Next, at Step S10, the BLE communication control module 83 of the smartphone 2 and the BLE communication control module 79 of the communication range limiting device 1 temporarily disconnect the BLE communication in order to enable connection of a new device. Thereafter, at Step S11, the device connecting module 75 of the communication range limiting device 1 transmits an advertisement packet that includes the communication range information indicating the BLE communication area 6, as described previously with reference to Step S1. The device connecting module 75 of the communication range limiting device 1 then attempts to establish a wireless LAN communication line with a device such as the smartphone 2 located in the BLE communication area 6 through the BLE communication as described previously.

Basic Connection Operation with Respect to Printer Device

Figure 10:
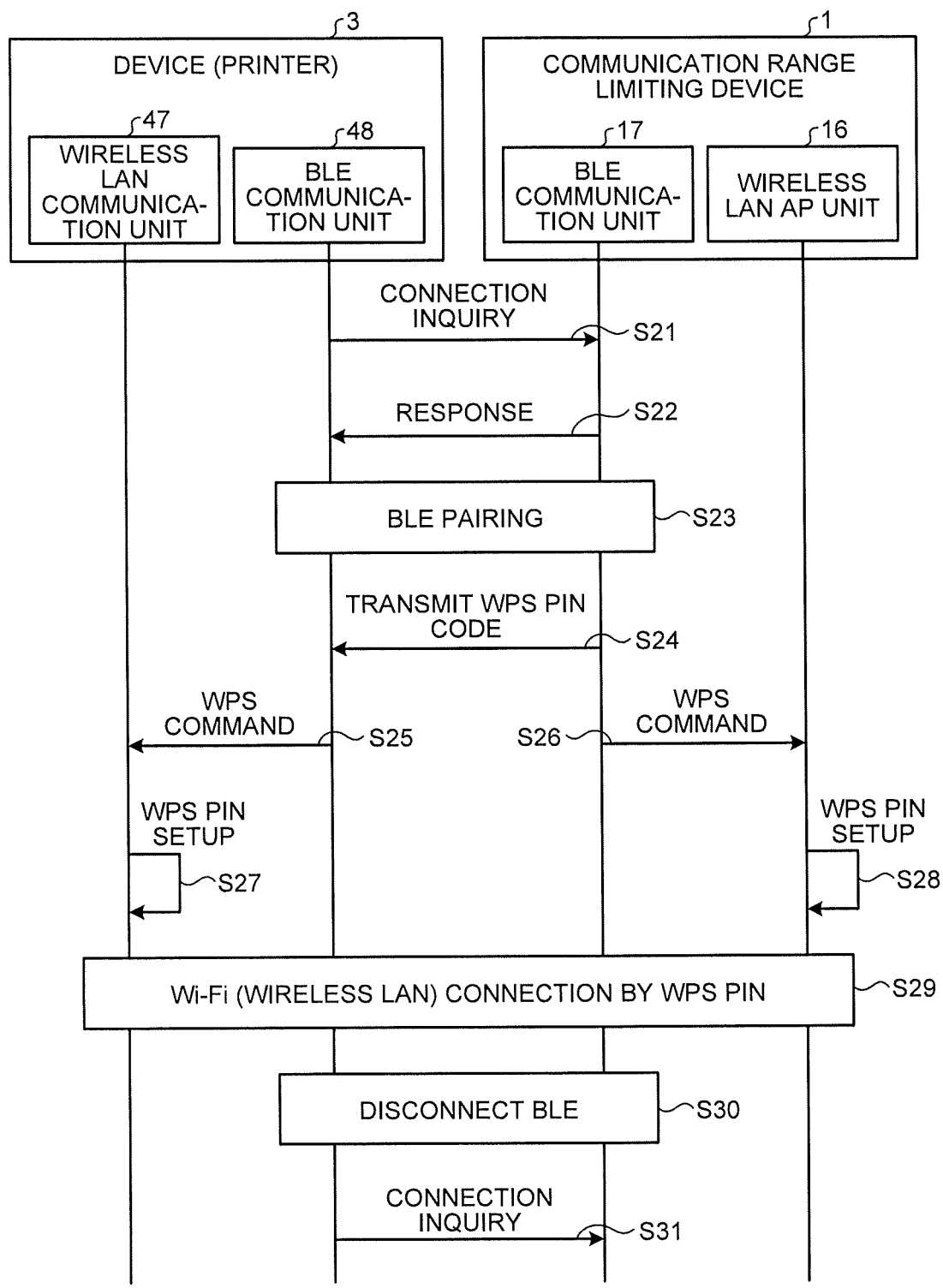
FIG. 10 is a sequence diagram illustrating that a printer device disposed in the BLE communication area within the wireless LAN communication area establishes a wireless LAN communication line in the wireless LAN communication scheme that is the basic configuration.

FIG. 10 is a sequence diagram illustrating that the printer device 3 disposed in the BLE communication area 6 within the wireless LAN communication area 5 establishes a wireless LAN communication line. The printer device 3 as a peripheral device effectively functions when it receives a print request from a device that makes a print request, such as the smartphone 2. Thus, to establish wireless LAN communication with the printer device 3, preferably, the smartphone 2 or the like that controls the printer device 3 has previously been connected to the wireless LAN. The sequence diagram illustrated in FIG. 10 assumes that the smartphone 2 has already been connected to the wireless LAN (see the description for FIG. 9). The sequence diagram illustrated in FIG. 10 starts its process with Step S21 when the transmission of an advertisement packet is enabled by the temporary disconnection of the BLE communication between the smartphone 2 and the communication range limiting device 1 at Step S10 illustrated in FIG. 9.

The printer device 3 is a stationary device disposed in the BLE communication area 6 of the communication range limiting device 1. At Step S21, the printer device 3 transmits, at regular intervals and through the abovementioned three advertisement channels, an advertisement packet that includes connection inquiry information for inquiring whether a device to make a print request such as the smartphone 2 has been connected to the wireless LAN to the communication range limiting device 1 via the BLE communication unit 48. The peripheral device connecting module 76 of the communication range limiting device 1 illustrated in FIG. 6 transmits, at Step S22 to the printer device 3 via the BLE communication unit 17, a response that indicates whether a device to make a print request has been connected.

If a device to make a print request such as the smartphone 2 has been connected to the wireless LAN, the peripheral device connecting module 76 of the communication range limiting device 1 and the BLE communication unit 48 of the printer device 3 perform pairing for the BLE communication (BLE pairing) at Step S23. The BLE pairing enables the BLE communication between the printer device 3 and the communication range limiting device 1.

When the BLE pairing is completed, the peripheral device connecting module 76 of the communication range limiting device 1 transmits to the printer device 3 at Step S24 a PIN code of the WPS system that facilitates wireless LAN connection and is standardized by Wi-Fi Alliance. Additionally, the communication range limiting device 1 transfers, at Step S26 to the wireless LAN AP unit 16, the PIN code that has been transmitted to the printer device 3, thereby issuing a command to prepare for starting communication by the WPS system. The wireless LAN AP unit 16 of the communication range limiting device 1 performs setup for the WPS system using the PIN code transmitted to the printer device 3 at Step S28.

The BLE communication unit 48 of the printer device 3, having received the PIN code of the WPS system from the communication range limiting device 1, transfers at Step S25 the received PIN code to the wireless LAN communication unit 47, thereby issuing a command to prepare for starting communication by the WPS system. At Step S27, the wireless LAN communication unit 47 performs setup for the WPS system using the PIN code transferred from the BLE communication unit 48. This establishes Wi-Fi connection (wireless LAN connection) between the printer device 3 and the communication range limiting device 1 by the WPS system through the use of the PIN code.

Next, at Step S30, the BLE communication unit 48 of the printer device 3 and the BLE communication unit 17 of the communication range limiting device 1 temporarily disconnect the BLE communication in order to enable connection of a new device. Thereafter, at Step S31, the BLE communication unit 48 of the printer device 3 transmits an advertisement packet that includes the connection inquiry information, as described previously with reference to Step S21. When a device to make a print request is connected to the wireless LAN, the communication range limiting device 1 attempts to establish a wireless LAN communication line with the printer device 3 located in the BLE communication area 6 through the BLE communication as described previously.

Print Operation

Figure 11:
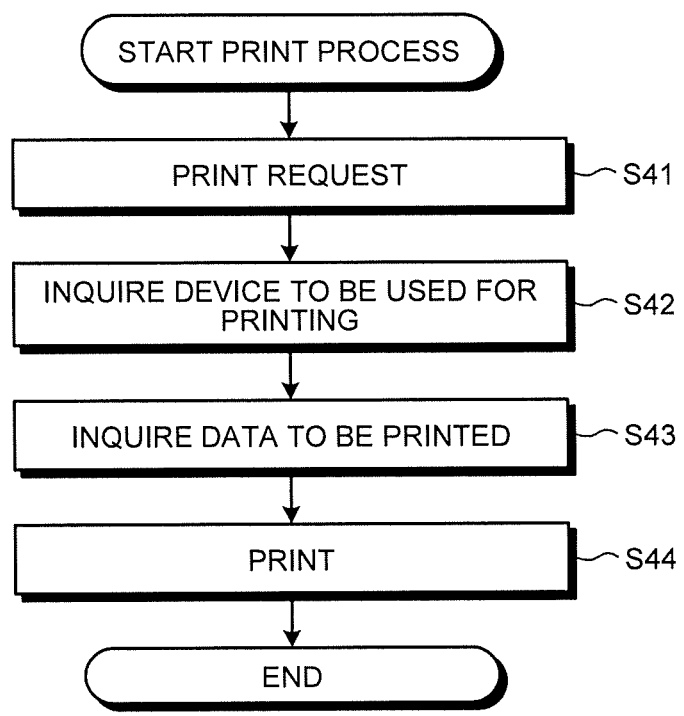
FIG. 11 is a flowchart illustrating that a smartphone connected to a wireless LAN remotely controls and causes a printer device to produce a printed matter in the wireless LAN communication scheme that is the basic configuration.

The flowchart illustrated in FIG. 11 illustrates that the smartphone 2 connected to the wireless LAN remotely controls and causes the printer device 3 to produce a printed matter. As described previously, the mutual connection established between the smartphone 2 and the printer device 3 via the wireless LAN communication units 31 and 47 in the wireless LAN enables remote control of the printer device 3 by the smartphone 2.

When using the smartphone 2 to remotely control the printer device 3, the user operates to start a print application program stored in memory of, for example, the ROM 22 of the smartphone 2. When the print application program is started to operate, the print request module 81 of the smartphone 2 illustrated in FIG. 7 makes a print request to the printer device 3 via the wireless LAN communication control module 82 and the wireless LAN communication unit 31 at Step S41. The print module 85 of the printer device 3 illustrated in FIG. 8, upon receipt of the print request, inquires a device to be used for printing of the smartphone 2 via the wireless LAN communication unit 47 at Step S42. If data stored in the smartphone 2 is to be printed, the user notifies the printer device 3 that the device to be used for printing is the smartphone 2 through the wireless LAN communication. If an image projected with the projector device 4, for example, is to be printed, the user notifies the printer device 3 that the device to be used for printing is the projector device 4 through the wireless LAN communication.

At Step S43, the print module 85 of the printer device 3 inquires data to be printed of the smartphone 2 through the wireless LAN communication. If data, such as an image or text, stored in the smartphone 2 is to be printed, the user notifies the printer device 3 that the data to be printed is data stored in the smartphone 2 through the wireless LAN communication. Alternatively, if an image or other data projected with the projector device 4 is to be printed, the user notifies the printer device 3 that the data to be printed is data projected with the projector device 4 through the wireless LAN communication. Finally, at Step S44, the print module 85 of the printer device 3 executes printing by acquiring the data specified by the user from the device specified by the user (the smartphone 2 or the projector device 4) through the wireless LAN communication.

Device Disconnecting Operation

Figure 12:
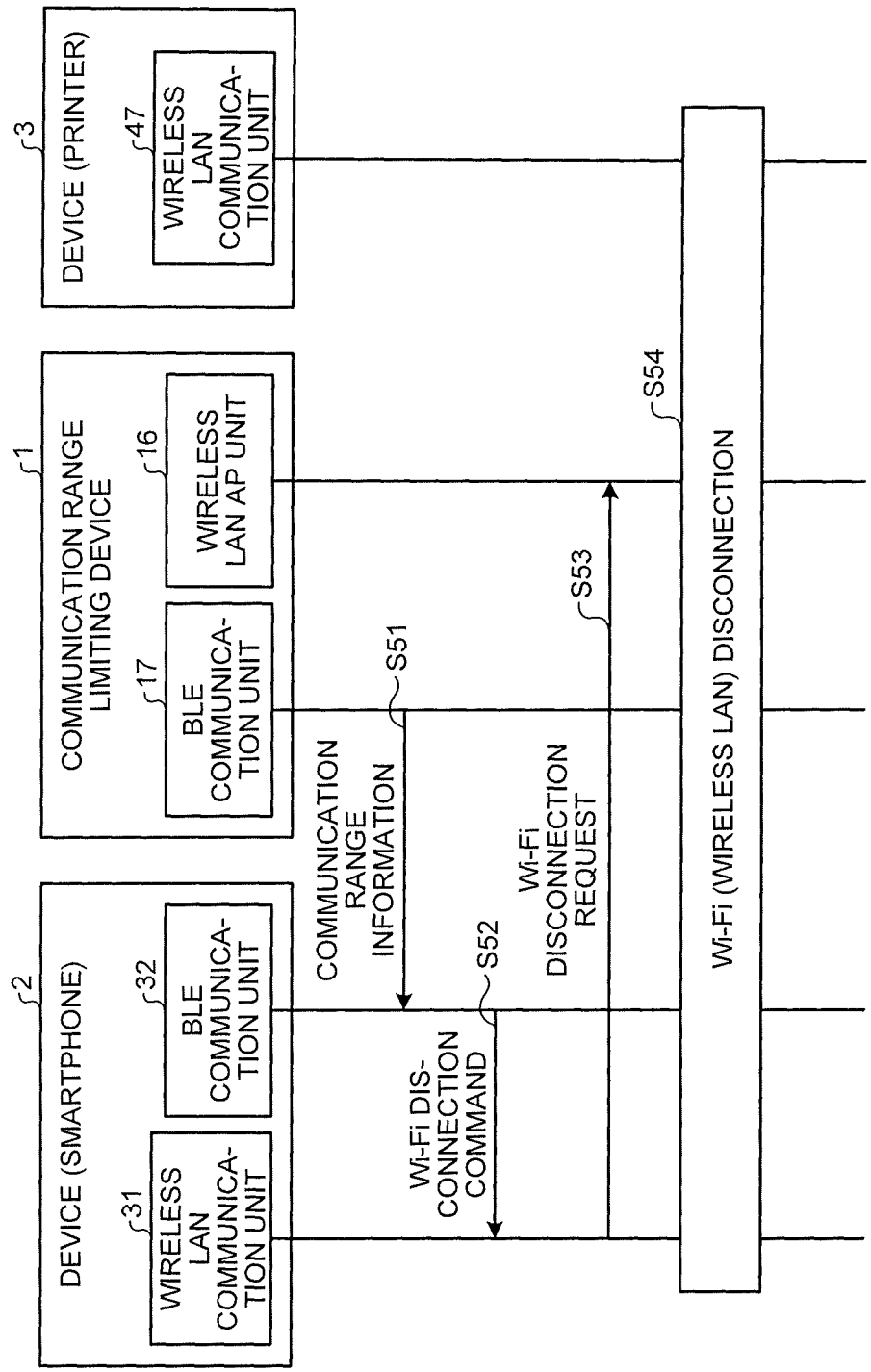
FIG. 12 is a sequence diagram illustrating that a wireless LAN communication line (and a BLE communication line) is disconnected when a smartphone connected in the BLE communication area to a printer device through a wireless LAN moves out of the BLE communication area in the wireless LAN communication scheme that is the basic configuration.

FIG. 12 is a sequence diagram illustrating that the wireless LAN communication line (and the BLE communication line) is disconnected when the smartphone 2 connected in the BLE communication area 6 to the printer device 3 through the wireless LAN moves out of the BLE communication area 6. At Step S51, as described previously, the communication range information that indicates the communication range corresponding to the BLE communication area 6 is transmitted from the BLE communication unit 17 of the communication range limiting device 1 to the smartphone 2 through the BLE communication. The smartphone 2 compares the position of the communication range limiting device detected by, for example, its global positioning system (GPS) with the BLE communication area 6 indicated by the communication range information. The smartphone 2, when having detected that the communication range limiting device is outside the BLE communication area 6, instructs the wireless LAN communication unit 31 to disconnect the wireless LAN (Wi-Fi disconnection command) at Step S52.

It is noted that, in this example, the communication range limiting device 1 transmits the communication range information to the smartphone 2 and the smartphone 2 compares the current position of the communication range limiting device with the BLE communication area 6 indicated by the communication range information to thereby detect withdrawal from the BLE communication area 6. Another arrangement may nonetheless be made in which the smartphone 2 transmits the current position of the communication range limiting device detected with the GPS or the like to the communication range limiting device 1 through the BLE communication and the communication range limiting device 1 compares the current position of the smartphone 2 with the BLE communication area 6 to thereby detect withdrawal of the device such as the smartphone 2 from the BLE communication area 6. In this arrangement, the withdrawal detecting module 77 illustrated in FIG. 6 is to detect the withdrawal of the device such as the smartphone 2 from the BLE communication area 6.

The wireless LAN communication unit 31 of the smartphone 2, when instructed by the BLE communication unit 32 to disconnect the wireless LAN, requests the communication range limiting device 1 to disconnect the wireless LAN using the wireless LAN communication at Step S53. The communication range limiting device 1, upon receipt of the wireless LAN disconnection request, disconnects the wireless LAN communication line associated with the device that has made the wireless LAN disconnection request as indicated by Step S54. This disconnects the wireless LAN communication line for not only the smartphone 2, but also the printer device 3.

To re-establish the wireless LAN communication line after it has been disconnected, the communication range limiting device 1 renews the PIN code. As a result, when the smartphone 2 that has moved out of the BLE communication area 6 re-enters the BLE communication area 6, the wireless LAN communication line is established using a PIN code different from the previous one.

As described above, the wireless LAN communication scheme can automatically disconnect the wireless LAN communication line and the BLE communication line when the smartphone 2 moves out of the BLE communication area 6. This capability allows the range in which the smartphone 2 can be connected to the wireless LAN to be limited to a predetermined range (within the BLE communication area 6). In addition to the smartphone 2 that has moved out of the BLE communication area 6, the wireless LAN communication scheme further disconnects the wireless LAN communication line of the printer device 3 that has been communicating with the smartphone 2. This arrangement prevents an inconvenience in which the connection of the printer device 3 to the wireless LAN communication line that is no longer used as a result of the disconnection of the wireless LAN communication line with respect to the smartphone 2 continues to exist wastefully, so that an even greater communication security can be achieved. Specifically, even a user who is not authorized to connect to a local network such as an in-house LAN is temporarily and simply allowed to have his or her device connected to the local network and to use his or her device, while security of the local network is ensured.

Additionally, the PIN code is renewed when the wireless LAN communication line that has previously been disconnected is to be re-established. This arrangement prevents the following illegal act: the smartphone 2 that has moved out of the BLE communication area 6 reuses the PIN code used in the last connection to thereby attempt to intercept another device through the wireless LAN communication.

When the smartphone 2 moves out of the BLE communication area 6, the wireless LAN communication line is disconnected of the printer device 3 that has been communicating with the smartphone 2 as well as the smartphone 2. This arrangement prevents an inconvenience in which the connection of the printer device 3 to the wireless LAN communication line that is no longer used as a result of the disconnection of the wireless LAN communication line with respect to the smartphone 2 continues to exist wastefully, so that an even greater communication security can be achieved.

It is noted that a public key may be delivered in place of the PIN code of the WPS system that is delivered from the communication range limiting device 1 to a device such as the smartphone 2 through the BLE communication when the wireless LAN communication line is to be established. The wireless LAN communication line may be established by delivering, in place of the PIN code of the WPS system, a public key according to the Diffie-Hellman key exchange method, for example. In this case, the public key is transmitted and received within the BLE communication area 6, so that a wireless LAN administrator can monitor the transmission and reception of the public key. This approach clarifies, for example, the specific device that transmits the public key, the specific device that receives the public key, and the specific user. Thus, illegal communications by an illegal user and an illegal device, what is called spoofing, can be prevented. In addition, when the wireless LAN communication line that has previously been disconnected is to be re-established, preferably, a new public key different from the previous one is used as with the PIN code described previously.

Additionally, the PIN code or the public key may be transmitted by sound (an acoustic output propagating through a space) from the communication range limiting device 1 to a device such as the smartphone 2 or the printer device 3. Because the acoustic output offers spatial transmissibility poorer than that of the radio waves used in the BLE communication, the transmission and reception range of the PIN code, for example, can be limited to a range over which sound can be transmitted and received between devices. Thus, the PIN code or the like is transmitted and received in a narrow range which a system administrator, for example, can monitor. As a result, illegal communications by an illegal user and an illegal device, what is called spoofing, mentioned previously can be prevented even more reliably.

Additionally, presence of a device within the BLE communication area 6 may be monitored using received signal strength indication (RSSI) of the BLE communication unit 17 instead of the communication range information. By setting the received signal strength indications of the BLE communication regarded as an exit RSSI area and an entrance RSSI area to desired levels, the range over which connection can be made to the wireless LAN (range of the entrance RSSI area) can be dynamically adjusted within the BLE communication area 6.

Figure 13:
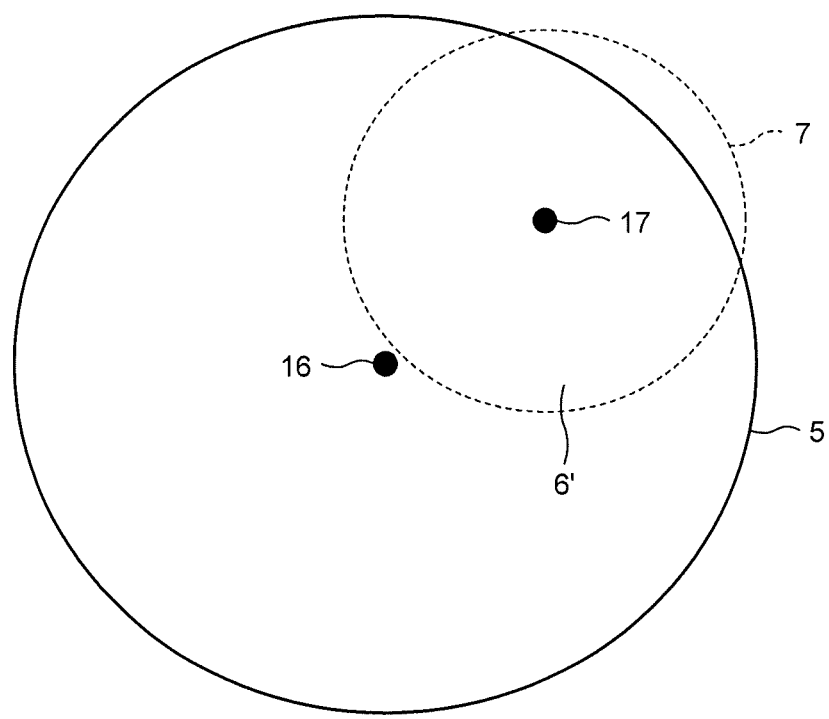
FIG. 13 is a system configuration diagram illustrating an exemplary case in which at least part of the BLE communication area is disposed outside the wireless LAN communication area in the wireless LAN communication scheme that is the basic configuration.

The above-described example encompasses the BLE communication area within the wireless LAN communication area. Nonetheless, as illustrated, for example, in FIG. 13, at least part of the BLE communication area may be disposed outside the wireless LAN communication area. In FIG. 13, a BLE communication area 6' represents an area in which the wireless LAN communication line can be established. This is because in a BLE communication area 7 outside the wireless LAN communication area, the setup for performing the wireless LAN communication cannot be made, though communication range information can be received through BLE communication. The condition illustrated in FIG. 13 is possible, for example, in a case in which the wireless LAN AP unit 16 and the BLE communication unit 17 are disposed at different positions and in a case in which the communication-enabled range protrudes in one direction because of communication directivity concerned.

First Embodiment

The following describes the wireless LAN communication scheme having the basic configuration as described above according to a first embodiment. The wireless LAN communication scheme in the first embodiment limits through BLE wireless communication the range in which the setup information for the wireless LAN communication is provided. The wireless LAN communication scheme in the first embodiment further limits through acoustic signals the range in which wireless LAN communication connection is maintained. This arrangement allows the user to acquire the setup information in the BLE wireless communication range to thereby establish a wireless LAN communication line and to perform wireless LAN communication in the range which the acoustic signals can reach. Thus, the communication-enabled range can be substantially accurately limited within an expected range, so that security of the wireless LAN communication scheme can be enhanced.

Figure 14:
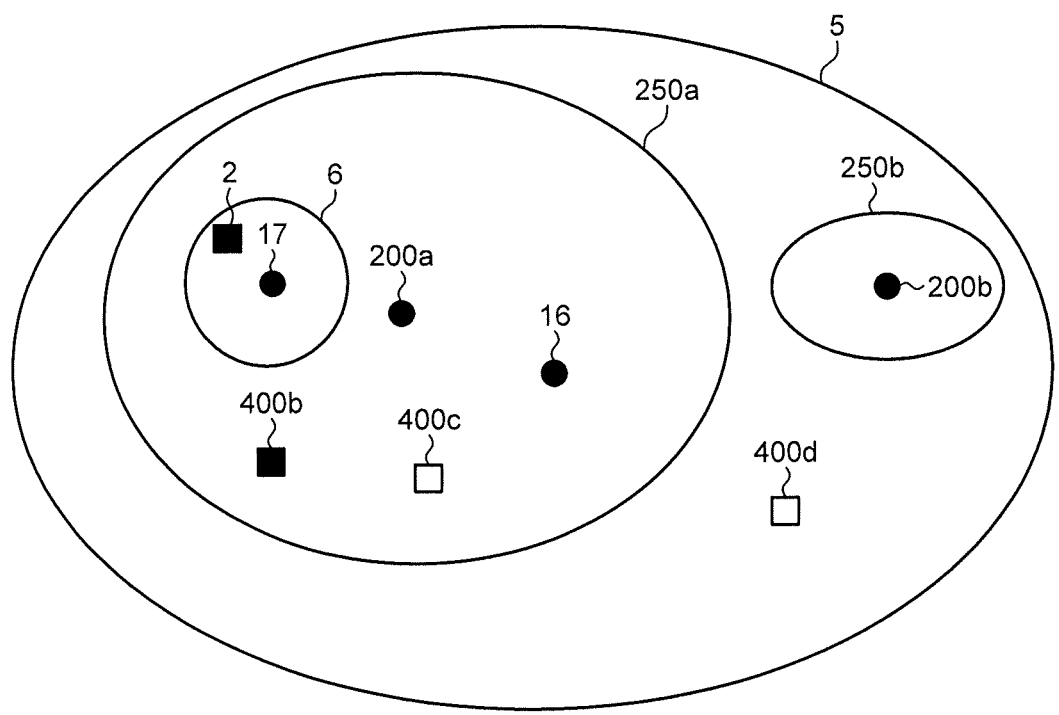
FIG. 14 is a system configuration diagram illustrating a wireless LAN communication scheme according to an embodiment.

FIG. 14 is a system configuration diagram illustrating the wireless LAN communication scheme according to the first embodiment. The wireless LAN communication area 5 illustrated in FIG. 14 represents a communication area formed by the wireless LAN AP unit 16 of the communication range limiting device 1 described earlier. The BLE communication area 6 represents a communication area formed by the BLE communication unit 17 of the communication range limiting device 1. The wireless LAN communication area 5 is an exemplary first communication area. The BLE communication area 6 is an exemplary second communication area.

It is noted that, in the present example, the wireless LAN AP unit 16 and the BLE communication unit 17 have been described to be integrated in the communication range limiting device 1; however, the wireless LAN AP unit 16 and the BLE communication unit 17 may, instead, be provided in physically different devices separately. Specifically, the wireless LAN AP unit 16 disposed in a first communication device may form the wireless LAN communication area 5 and the BLE communication unit 17 disposed in a second communication device may form the BLE communication area 6.

Additionally, in the present example, the BLE communication area 6 is included in an acoustic communication area 250a. Nonetheless, the acoustic communication area 250a may, instead, be included in the BLE communication area 6. In addition, the BLE communication area 6 and each of the acoustic communication area 250a and an acoustic communication area 250b may each be formed without overlapping each other in the wireless LAN communication area 5, or may each be formed so as to slightly overlap each other in the wireless LAN communication area 5.

As illustrated in FIG. 14, under a condition in which the BLE communication area 6 is formed within the wireless LAN communication area 5, an acoustic signal transmission device 200a is disposed inside the wireless LAN communication area 5 and outside the BLE communication area 6. The acoustic signal transmission device 200a forms, within the wireless LAN communication area 5, the acoustic communication area 250a that includes the BLE communication area 6.

An acoustic signal transmission device 200b is disposed inside the wireless LAN communication area 5, and outside the BLE communication area 6 and the acoustic signal transmission device 200a. The acoustic signal transmission device 200b forms, within the wireless LAN communication area 5, the acoustic communication area 250b that is outside the BLE communication area 6 and the acoustic communication area 250a. It is noted that, although the example illustrated in FIG. 14 depicts the acoustic communication area 250a and the acoustic communication area 250b formed inside the wireless LAN communication area 5, only one acoustic communication area may be formed within the wireless LAN communication area 5.

The example of FIG. 14 illustrates that the smartphone 2 is disposed inside the BLE communication area 6, devices 400b and 400c are disposed inside the acoustic communication area 250, and a device 400d is disposed outside the acoustic communication area 250a and the acoustic communication area 250b, but inside the wireless LAN communication area 5.

Figure 15:
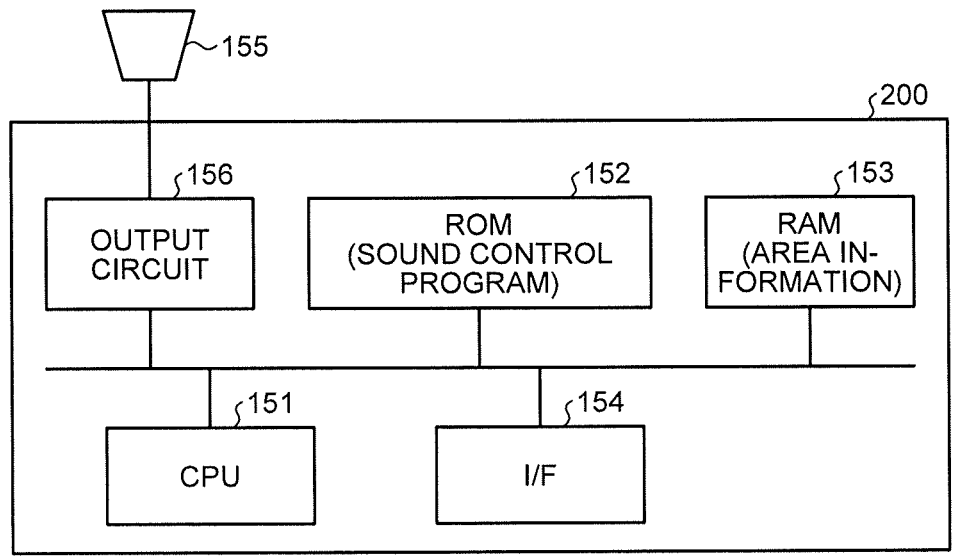
FIG. 15 is a hardware configuration diagram of an acoustic signal transmission device.

FIG. 15 is a hardware configuration diagram of the acoustic signal transmission device 200a and the acoustic signal transmission device 200b. In FIG. 15, the acoustic signal transmission device 200a and the acoustic signal transmission device 200b are collectively denoted as an acoustic signal transmission device 200. As illustrated in FIG. 15, the acoustic signal transmission device 200 includes a CPU 151, a ROM 152, a RAM 153, an interface (I/F) 154, a speaker unit 155, and an output circuit 156. The ROM 152 stores a sound control program. The RAM 153 stores area information that indicates the range in which the wireless LAN communication is enabled. The CPU 152 executes the sound control program to thereby control the output circuit 156 such that the area information that is the acoustic signal is output continuously or regularly (intermittently) in the wireless LAN communication area 5.

The output circuit 156 exemplarily outputs area information generated by an amplitude shift keying (ASK) modulation process. The ASK modulation process represents a "1" or a "0" of a digital signal as a difference in amplitude. The output circuit 156 divides, for example, a frequency band of 18 kHz to 20 kHz that is hardly audible to human ears into a plurality of frequency bands. The output circuit 156 then performs on-off control of an acoustic wave in each frequency band to thereby generate area information and outputs the area information via the speaker unit 155.

Figure 16:
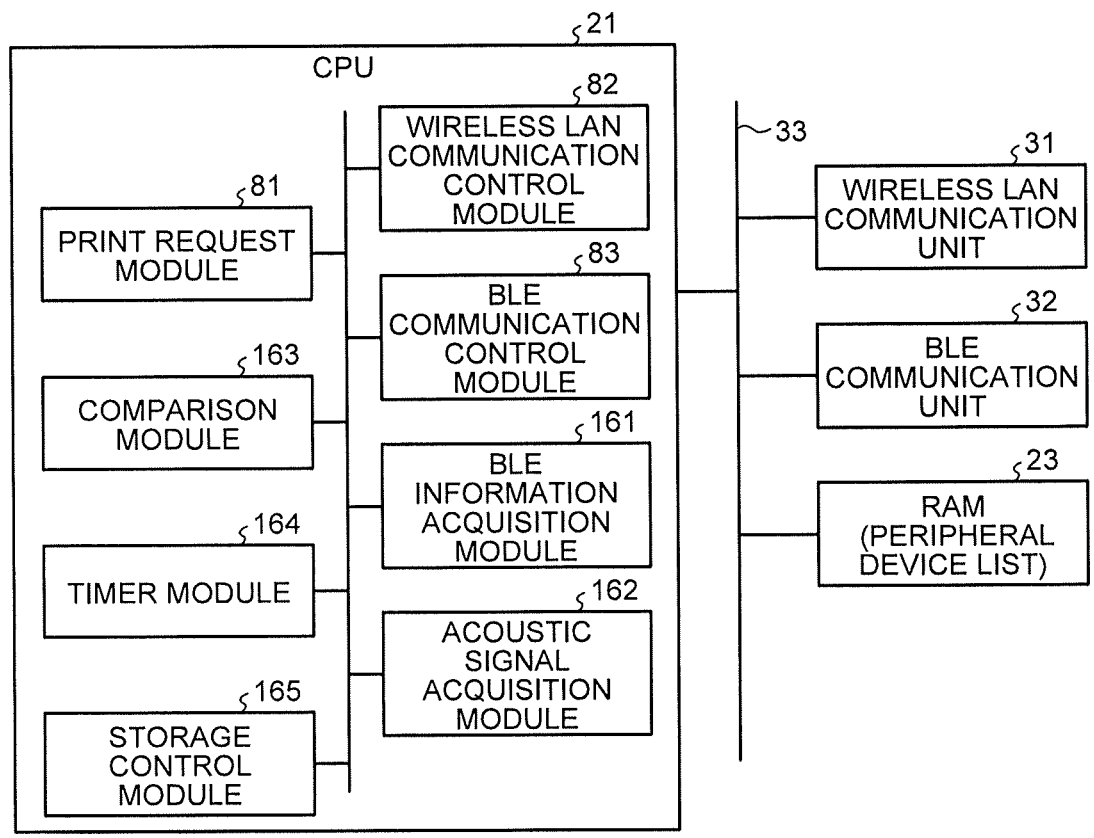
FIG. 16 is a functional block diagram of the smartphone.

FIG. 16 is a functional block diagram illustrating functions achieved by the CPU 21 of the smartphone 2 illustrated in FIG. 14 when the CPU 21 executes the communication control program (see FIG. 3) stored in the ROM 22. As illustrated in FIG. 16, the CPU 21 includes, in addition to the print request module 81, the wireless LAN communication control module 82, and the BLE communication control module 83 described previously, a BLE information acquisition module 161, an acoustic signal acquisition module 162, a comparison module 163, a timer module 164, and a storage control module 165. It is noted that the elements from the print request module 81 to the BLE communication control module 83, and from the BLE information acquisition module 161 to the storage control module 165 may be achieved in part or in whole by an integrated circuit (IC) or by hardware.

The comparison module 163 (exemplary comparator) compares the area information that is acquired through BLE communication and that indicates the range in which the wireless LAN communication is enabled (exemplary first area information) with area information acquired as an acoustic signal from the acoustic signal transmission device 200 (exemplary second area information). When it is found that the two pieces of area information are identical to each other, the comparison module 163 determines that the communication range limiting device is located in the range in which the wireless LAN communication is enabled. The timer module 164 measures a period of time that has elapsed after non-detection of the area information as a result that the smartphone 2 has moved out of the acoustic communication area in which the area information was acquired.

The storage control module 165 controls a peripheral device list (exemplary communication information storage unit) to be described later by saving the peripheral device list in a storage, such as the RAM 23. The BLE information acquisition module 161 acquires in the BLE communication area 6 the area information and wireless LAN setup information transmitted through BLE communication from the BLE communication unit 17. The acoustic signal acquisition module 162 acquires in the acoustic communication areas 250a and 250b area information collected via the microphone unit 25 (see FIG. 3).

It should here be noted that the smartphone 2 is capable of BLE communication or wireless LAN communication (Wi-Fi communication) with each of peripheral devices listed in the peripheral device list transmitted from the communication range limiting device 1 in the BLE communication area 6 in which the smartphone 2 is currently located. Specifically, the communication range limiting device 1 controls each of the devices, for which the wireless LAN communication has been enabled, on the basis of a stored peripheral device list that associates a media access control (MAC) address with a corresponding Internet Protocol (IP) address, Bluetooth (registered trademark) address, operating information for operating the specific device, and an acoustic communication area name in which the specific device is currently located (name of the area to which the device belongs).

The smartphone 2, after having completed the setup with the communication range limiting device 1, transmits to the communication range limiting device 1 information on the communication range limiting device including the MAC address and the IP address, and the acoustic communication area name in which the smartphone 2 is currently located. The communication range limiting device 1 adds the MAC address and the IP address received from the smartphone 2 to the peripheral device list with reference to the acoustic communication area name in which the smartphone 2 is currently located.

Figure 17:
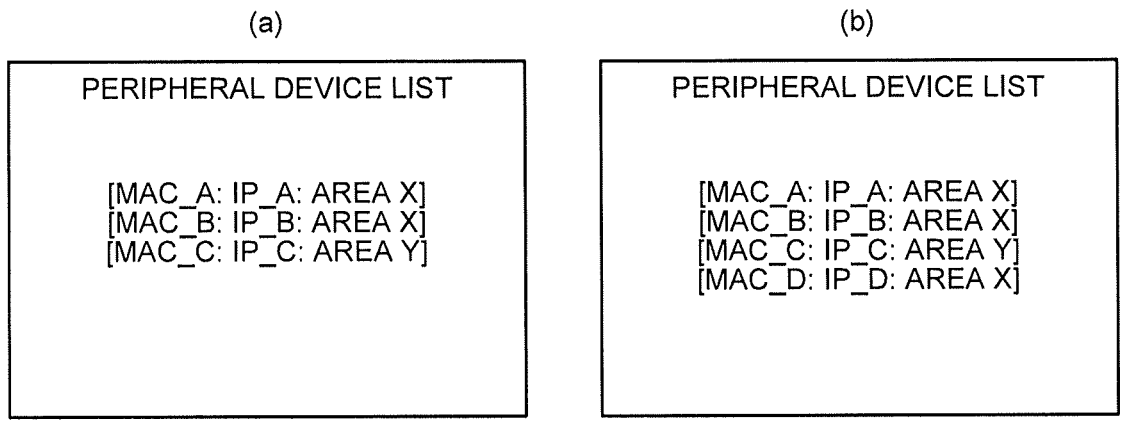
FIG. 17 illustrates exemplary peripheral device lists distributed to each of devices within an acoustic communication area.

FIG. 17 illustrates exemplary peripheral device lists. In FIG. 17, (a) represents a peripheral device list before updating (before a device moves into the acoustic communication area). In FIG. 17, (b) represents a peripheral device list after the updating. Consider a case, for example, in which device D moves into an acoustic communication area in which devices A to C are located. In this case, the peripheral device list is updated to include additional information on device D as illustrated in FIG. 17(b).

The communication range limiting device 1 transmits the peripheral device list that includes the information on the added smartphone 2 to each of the devices located in the acoustic communication area to which a connected device has been added, specifically, the acoustic communication area in which the smartphone 2 is currently located. Each of the devices stores the peripheral device list received from the communication range limiting device 1 in a storage of, for example, the RAM or HDD. The storage control module 165 of the smartphone 2 illustrated in FIG. 16 saves the peripheral device list received from the communication range limiting device 1 in the RAM 23. The saving allows each of the devices to recognize other devices located in the acoustic communication area in which the communication range limiting device is currently located.

Figure 18:
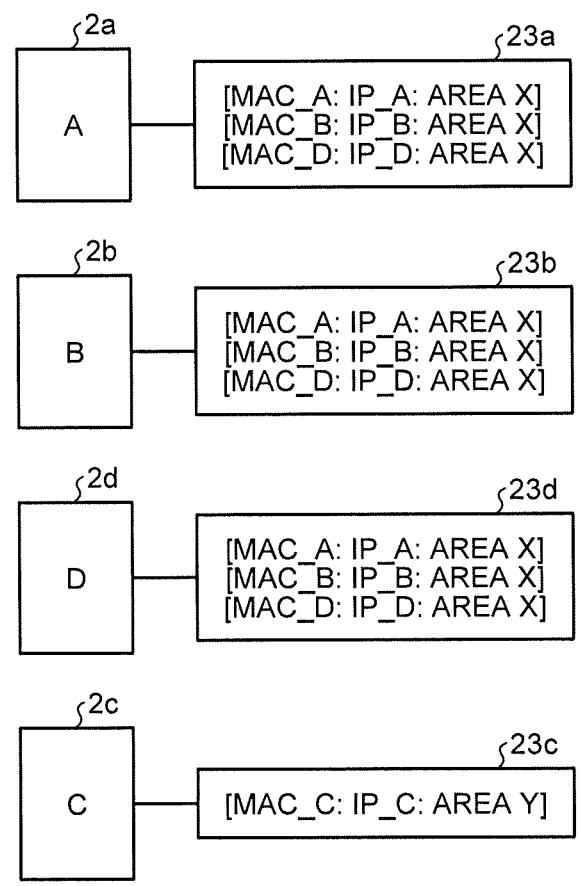
FIG. 18 is a diagram for illustrating how a peripheral device list to be distributed to the device differs from one acoustic communication area to another.

FIG. 18 illustrates peripheral device lists stored in different devices. In the example illustrated in FIG. 18, a smartphone 2a, a smartphone 2b, and a smartphone 2d are each located in an identical acoustic communication area X (area X). As a result, a RAM 23a, a RAM 23b, and a RAM 23d of the smartphone 2a, the smartphone 2b, and the smartphone 2d, respectively, store an identical peripheral device list.

A smartphone 2c is, however, located in an acoustic communication area Y (area Y) that is different from the acoustic communication area X (area X) in which the smartphone 2a, the smartphone 2b, and the smartphone 2d are located. Additionally, only the smartphone 2c is currently located in the acoustic communication area Y. Thus, a RAM 23c of the smartphone 2c stores a peripheral device list that lists only the smartphone 2c.

Each of the devices located in the same acoustic communication area communicates with a desired device using the MAC address, the IP address, the Bluetooth address, and the like indicated on the peripheral device list. The peripheral device list transmitted from the communication range limiting device 1 to each device represents a list of peripheral devices corresponding to the devices located in the acoustic communication area in which the communication range limiting device is currently located. No peripheral device lists covering other acoustic communication areas are not to be transmitted. This arrangement allows communication between devices to be limited to the acoustic communication area in which the communication range limiting device is currently located.

It is noted that the communication range limiting device 1 updates the peripheral device list by deleting from the peripheral device list information associated with a specific device for which a wireless LAN communication disconnection process has been performed. Upon each performance of updating, the communication range limiting device 1 transmits an updated peripheral device list to each of the devices located in the corresponding acoustic communication area. The transmission of the updated peripheral device list causes each device to update the peripheral device list stored in, for example, the RAM 23.

Figure 19:
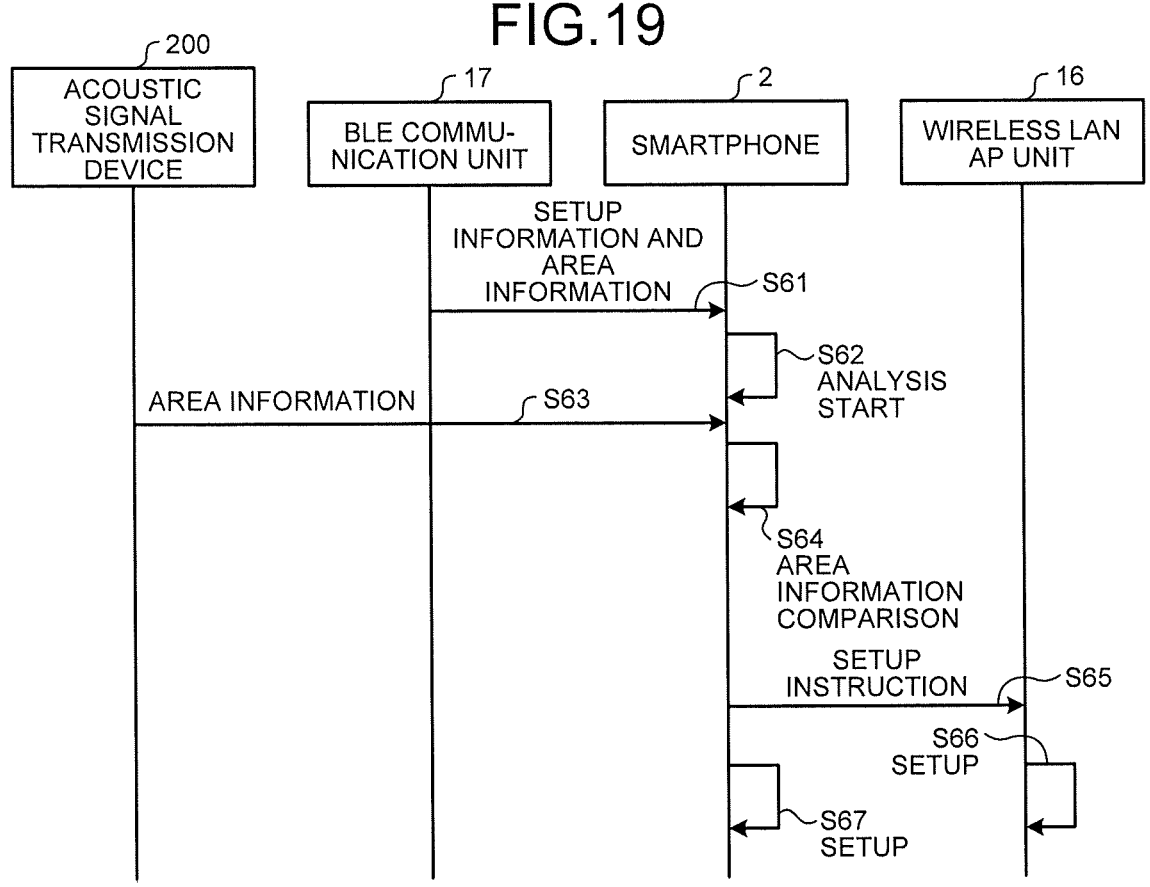
FIG. 19 is a sequence diagram for illustrating a wireless LAN setup operation to be performed using BLE communication and acoustic communication.

The following describes, with reference to the sequence diagram illustrated in FIG. 19, a wireless LAN setup operation to be performed using BLE communication and the acoustic communication. When the smartphone 2 moves into the BLE communication area 6 as illustrated in FIG. 14, BLE communication is performed between the BLE communication unit 17 of the communication range limiting device 1 and the smartphone 2. The BLE communication unit 17 transmits to the smartphone 2 through BLE communication the wireless LAN setup information and the area information that indicates the acoustic communication area in which the wireless LAN communication is enabled (Step S61). The BLE information acquisition module 161 (an exemplary first acquisition module and an exemplary third acquisition module) of the smartphone 2 acquires the setup information and the area information received from the BLE communication unit 17. This acquisition causes analysis of the area information to be started (Step S62).

As described previously, the acoustic signal transmission device 200 transmits the area information that indicates the acoustic communication area in which the wireless LAN communication is enabled. The acoustic signal acquisition module 162 (an exemplary second acquisition module) of the smartphone 2 receives the area information from the acoustic signal transmission device 200 as indicated at Step S63.

It should here be noted that the acoustic communication area may correspond substantially with the BLE communication area 6 or that part of the acoustic communication area may overlap the BLE communication area 6. In addition, the acoustic communication area may include the BLE communication area 6 as with the acoustic communication area 250a illustrated in FIG. 14 or may exclude (may be spaced away from) the BLE communication area 6 as with the acoustic communication area 250b illustrated in FIG. 14. In the example illustrated in FIG. 14, the smartphone 2 is located inside the BLE communication area 6 that is included in the acoustic communication area 250a. In such a case, the acoustic signal acquisition module 162 of the smartphone 2 receives the area information transmitted from the acoustic signal transmission device 200a within the BLE communication area 6 at Step S63.

In contrast, for an acoustic communication area that is spaced away from the BLE communication area 6, specifically, the acoustic communication area 250b for example, the user of the smartphone 2, after having received the setup information and the area information in the BLE communication area 6, moves into the acoustic communication area 250b and receives the area information transmitted from the acoustic signal transmission device 200b at Step S63.

The comparison module 163 of the smartphone 2 compares the area information that is acquired through BLE communication and indicates the acoustic communication area in which the wireless LAN communication is enabled with the area information that is acquired from the acoustic signal transmission device 200 and indicates the acoustic communication area in which the communication range limiting device is currently located. When it is determined by this comparison that the communication range limiting device is located in the acoustic communication area in which the wireless LAN communication is enabled, the BLE communication control module 83 of the smartphone 2 uses the setup information acquired at Step S61 to transmit a setup instruction to the wireless LAN AP unit 16 via the BLE communication unit 17 of the communication range limiting device 1. The transmission of the setup instruction causes each of the communication range limiting device 1 and the wireless LAN communication control module 82 (an exemplary setup module) of the smartphone 2 to perform a setup of the wireless LAN communication line (Step S66 and Step S67).

As described above, the wireless LAN communication scheme in the first embodiment limits distribution of the setup information for the wireless LAN communication and the area information that indicates the acoustic communication area in which the wireless LAN communication is enabled to the BLE communication area 6. The wireless LAN communication scheme in the first embodiment further limits the range in which the wireless LAN communication is enabled to the acoustic communication area indicated by the distributed area information. This arrangement allows the user to acquire the setup information and the area information in the BLE wireless communication range to thereby establish a wireless LAN communication line and to perform the wireless LAN communication within the range (within the acoustic communication area) that the area information that is the acoustic signal reaches. The foregoing arrangement enables the communication-enabled range to be substantially accurately limited within an expected range for the enhanced communication security.

Figure 20:
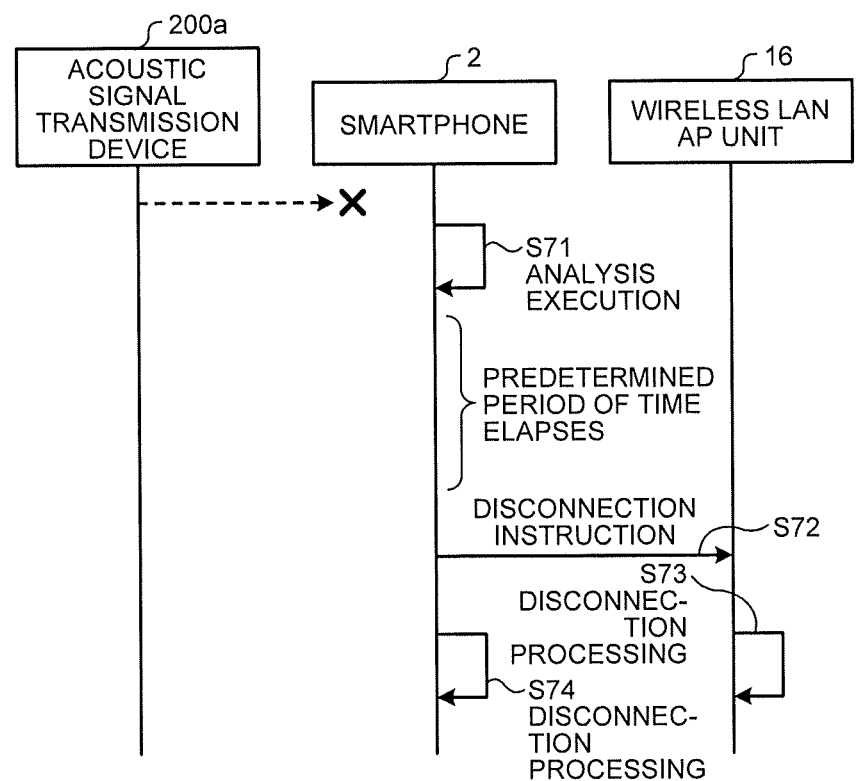
FIG. 20 is a sequence diagram for illustrating an operation in which a wireless LAN communication line is disconnected when area information cannot be acquired for a predetermined period of time or longer as a result that the smartphone moves out of the acoustic communication area in which the wireless LAN communication is enabled.

The following describes, with reference to a sequence diagram illustrated in FIG. 20, an operation in which the wireless LAN communication line is disconnected when the area information cannot be acquired for a predetermined period of time or longer as a result that the smartphone 2 moves out of the acoustic communication area in which the wireless LAN communication is enabled. When, for example, the smartphone 2 that has been located in the acoustic communication area 250a moves out of the acoustic communication area 250a, reception of the area information that has so far been received from the acoustic signal transmission device 200a is interrupted as indicated by the dotted line arrow in FIG. 20. The comparison module 163 of the smartphone 2 compares, as described above, the area information acquired through BLE communication with the area information acquired from the acoustic signal transmission device 200, thereby analyzing whether the communication range limiting device is located within the acoustic communication area in which the wireless LAN communication is enabled (Step S71).

The timer module 164 of the smartphone 2 counts a continuous period of time that has elapsed since the interruption of detection of the area information from the acoustic signal transmission device 200. When the timer module 164 has counted the predetermined continuous period of time elapsed after the interruption of the detection of the area information, the wireless LAN communication control module 82 transmits to the wireless LAN AP unit 16 an instruction to disconnect the wireless LAN communication line (Step S72). The transmission of the disconnection instruction causes the wireless LAN AP unit 16 of the communication range limiting device 1 to perform disconnection processing for the wireless LAN communication line that has been established with the smartphone 2 (Step S73). Similarly, the wireless LAN communication control module 82 of the smartphone 2 performs disconnection processing for the wireless LAN communication line that has been established with the communication range limiting device 1 (Step S74).

The example illustrated in FIG. 20 represents the disconnection processing performed for the wireless LAN communication line when the predetermined period of time elapses after the interruption of reception of the area information from the acoustic signal transmission device 200. The example illustrated in FIG. 21, on the other hand, depicts disconnection processing performed for the wireless LAN communication line when the area information that has so far been received from the acoustic signal transmission device 200 changes to area information that indicates a different acoustic communication area, considering that the smartphone 2 has moved to a different acoustic communication area.

Figure 21:
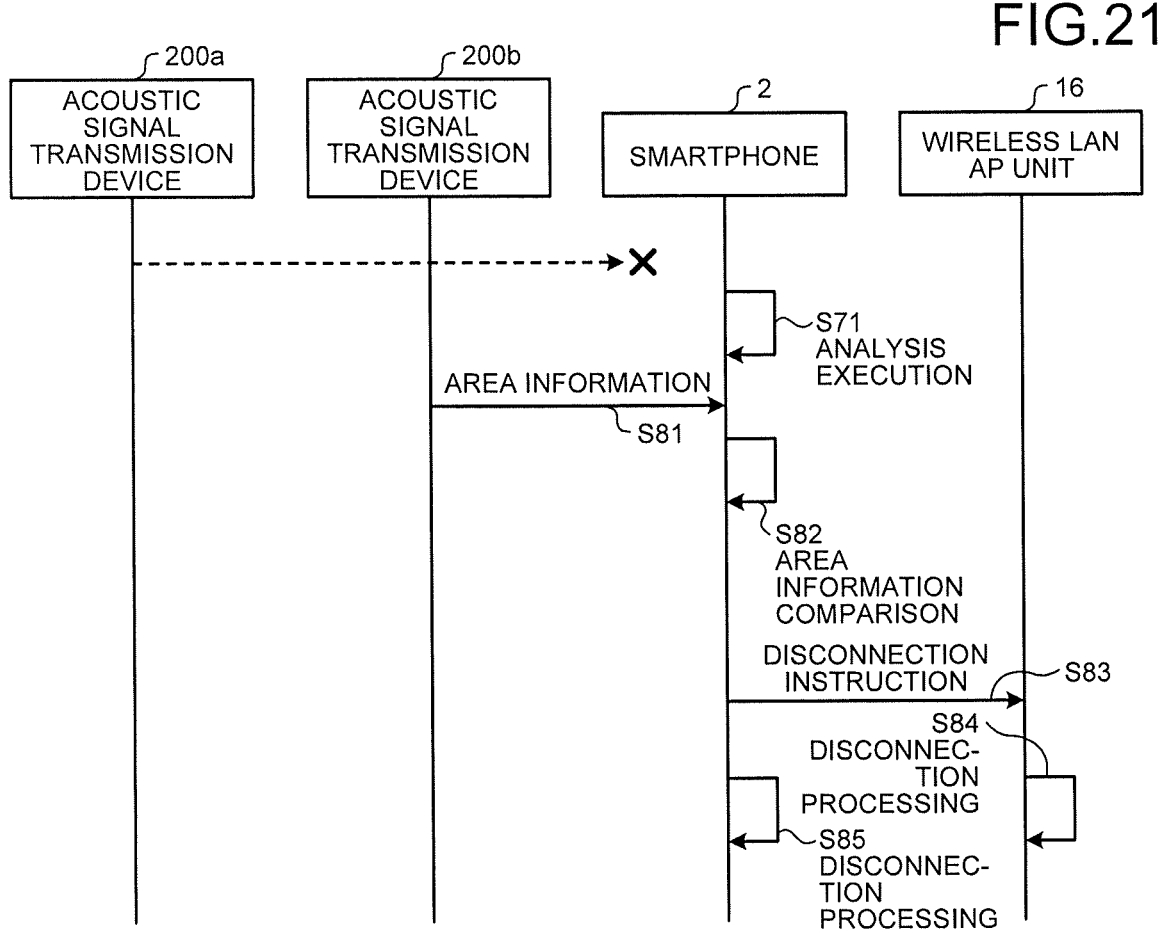
FIG. 21 is a sequence diagram for illustrating an operation to disconnect a wireless LAN communication line when the area information that has so far been received from the acoustic signal transmission device changes to area information that indicates a different acoustic communication area, considering that the smartphone has moved to a different acoustic communication area.

Specifically, when the smartphone 2 has moved from the acoustic communication area 250a formed by the acoustic signal transmission device 200a illustrated in FIG. 14 to the acoustic communication area 250b formed by the acoustic signal transmission device 200b illustrated in FIG. 14, reception of the area information that has so far been received from the acoustic signal transmission device 200a is interrupted as indicated by the dotted line arrow in FIG. 21. The smartphone 2 receives, instead, area information transmitted as an acoustic signal from the acoustic signal transmission device 200b in the acoustic communication area 250b (Step S81).

The comparison module 163 of the smartphone 2 compares the area information received in the BLE communication area 6 with area information to be received from the acoustic signal transmission device 200 (Step S71) and with area information received from the acoustic signal transmission device 200 (Step S82). When area information different from area information that has so far been received is received, the wireless LAN communication control module 82 of the smartphone 2 transmits a disconnection instruction to the wireless LAN AP unit 16 of the communication range limiting device 1 (Step S83). The transmission of the disconnection instruction causes the wireless LAN AP unit 16 of the communication range limiting device 1 to perform disconnection processing for the wireless LAN communication line that has been established with the smartphone 2 (Step S84). Similarly, the wireless LAN communication control module 82 (an exemplary disconnection module) of the smartphone 2 performs disconnection processing for the wireless LAN communication line that has been established with the communication range limiting device 1 (Step S85).

Figure 22:
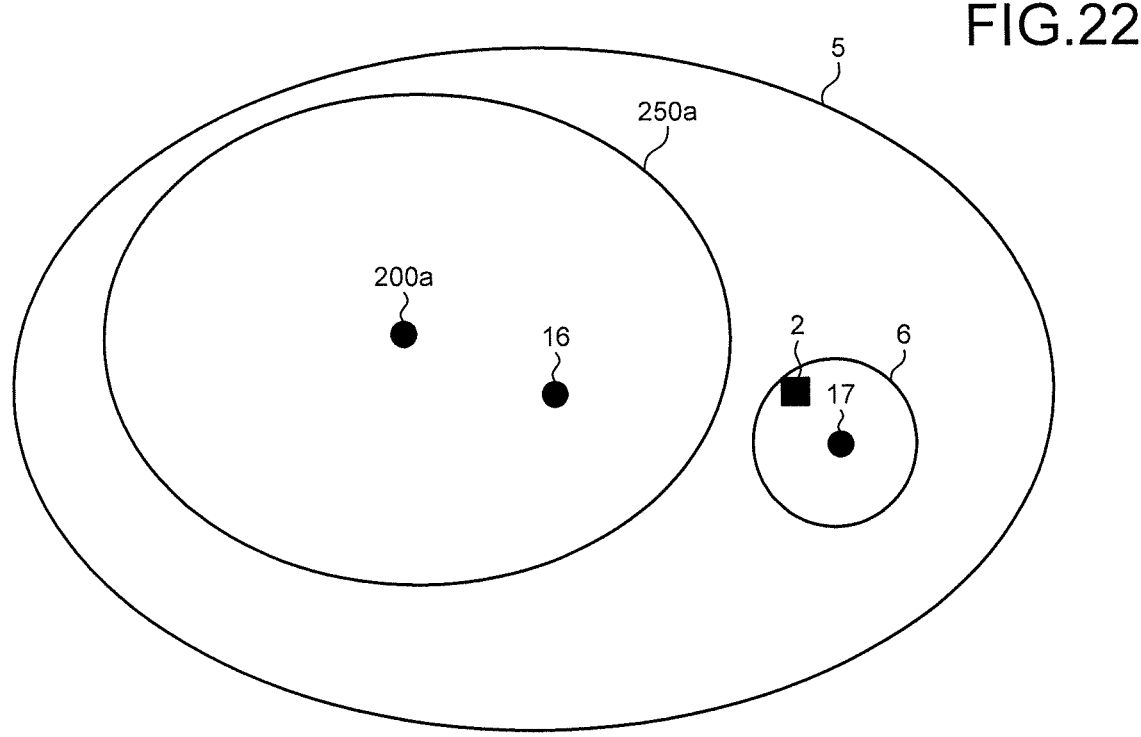
FIG. 22 is a diagram for illustrating a system configuration when the BLE communication area does not overlap the acoustic communication area formed by the acoustic signal transmission device.

Reference is made to FIG. 22. When the BLE communication area 6 does not overlap the acoustic communication area 250a formed by the acoustic signal transmission device 200a, the smartphone 2 is unable to perform wireless LAN communication (unable to set up for the wireless LAN communication) even by moving into the acoustic communication area 250a while the setup information is yet to be acquired. Thus, the smartphone 2 is required to move into the BLE communication area 6 and to acquire the setup information before moving into the acoustic communication area 250a. Distribution of the setup information through, for example, encrypted communication, however, involves increased communication cost when it is unknown whether the smartphone 2 needs the wireless LAN communication within the acoustic communication area 250a.

Figure 23:
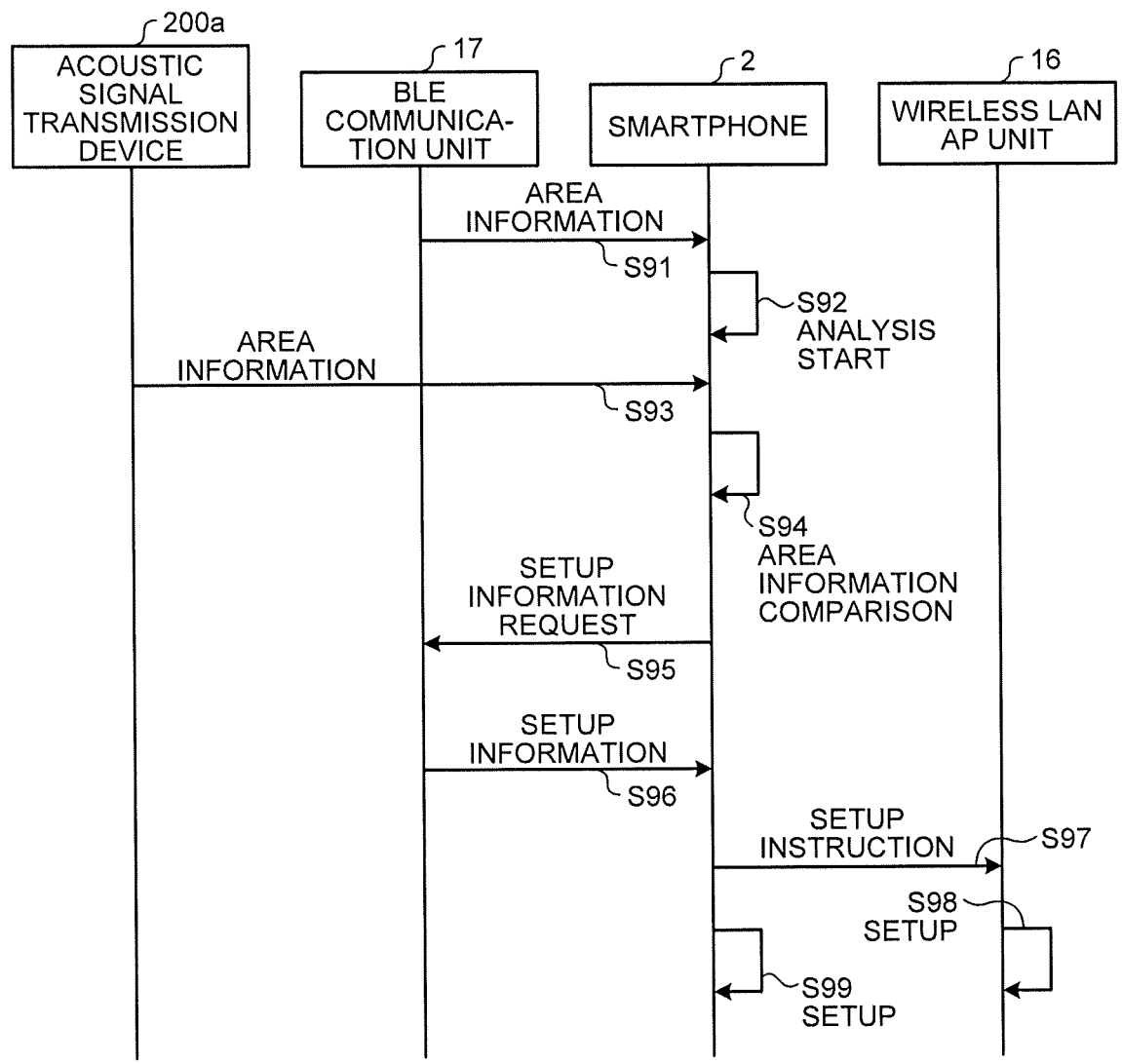
FIG. 23 is a flowchart for illustrating an operation in which area information that indicates an acoustic communication area in which the wireless LAN communication is enabled is distributed in advance and wireless LAN setup information is later distributed when it is determined that the smartphone is located within the acoustic communication area in which the wireless LAN communication is enabled.

Thus, the setup information may be distributed when the smartphone 2 is located within the acoustic communication area in which the wireless LAN communication is enabled as illustrated in a sequence diagram of FIG. 23. In this case, the smartphone 2 acquires, at Step S91, from the BLE communication unit 17 the area information that indicates the acoustic communication area in which the wireless LAN communication is enabled. The smartphone 2 starts analysis of the acquired area information at Step S92.

The smartphone 2, when it moves into the acoustic communication area 250a in which the wireless LAN communication is enabled, is able to receive the area information from the acoustic signal transmission device 200a (Step S93). The smartphone 2 compares the area information received through BLE communication with the area information received from the acoustic signal transmission device 200a (Step S94). When it is determined that the two pieces of area information are identical to each other, the smartphone 2 requests the BLE communication unit 17 to acquire the wireless LAN setup information through BLE communication (Step S95).

The smartphone 2, having acquired the setup information from the BLE communication unit 17 (Step S96), uses the acquired setup information to transmit a setup instruction to the wireless LAN AP unit 16. The instruction causes the wireless LAN AP unit 16 to establish a wireless LAN communication line with the smartphone 2 (Step S98). Similarly, the smartphone 2 establishes a wireless LAN communication line with the communication range limiting device 1 (Step S99).

As described above, the area information that indicates the acoustic communication area in which the wireless LAN communication is enabled is distributed in advance and the wireless LAN setup information is later distributed when the device moves into the acoustic communication area in which the wireless LAN communication is enabled. This arrangement eliminates the need for expensive communication cost involved in, for example, distributing the setup information through encrypted communication, so that the wireless LAN communication scheme can be operated at low cost.

As evident from the foregoing descriptions, the wireless LAN communication scheme according to the first embodiment limits the distribution of the setup information for the wireless LAN communication and the area information that indicates the acoustic communication area in which the wireless LAN communication is enabled to the BLE communication area 6. The wireless LAN communication scheme according to the first embodiment further limits the range in which the wireless LAN communication is enabled to the acoustic communication area indicated by the distributed area information. This arrangement allows the user to acquire the setup information and the area information in the BLE wireless communication range to thereby establish a wireless LAN communication line and to perform the wireless LAN communication within the range (the acoustic communication area) that the area information that is the acoustic signal reaches. The foregoing arrangement enables the communication-enabled range to be substantially accurately limited within an expected range, so that security can be enhanced of the wireless LAN communication scheme according to the first embodiment.

Second Embodiment

The following describes a wireless LAN communication scheme according to a second embodiment. In the first embodiment described above, when area information different from the area information that has so far been received is received, the wireless LAN communication control module 82 of the smartphone 2 transmits a disconnection instruction to the wireless LAN AP unit 16 of the communication range limiting device 1 to thereby immediately disconnect the wireless LAN communication line, as described with reference to Step S83 in FIG. 21.

In contrast, even when area information different from the area information that has so far been received is received after a device, such as a smartphone 2, has established a wireless LAN communication line, the wireless LAN communication scheme according to the second embodiment maintains the wireless LAN communication line, if the area information that has so far been received can be received within a predetermined period of time (connection-maintained time). The foregoing is the only difference in the second embodiment to be described hereunder from the first embodiment described previously. The following describes this difference only and omits duplicate descriptions.

Figure 24:
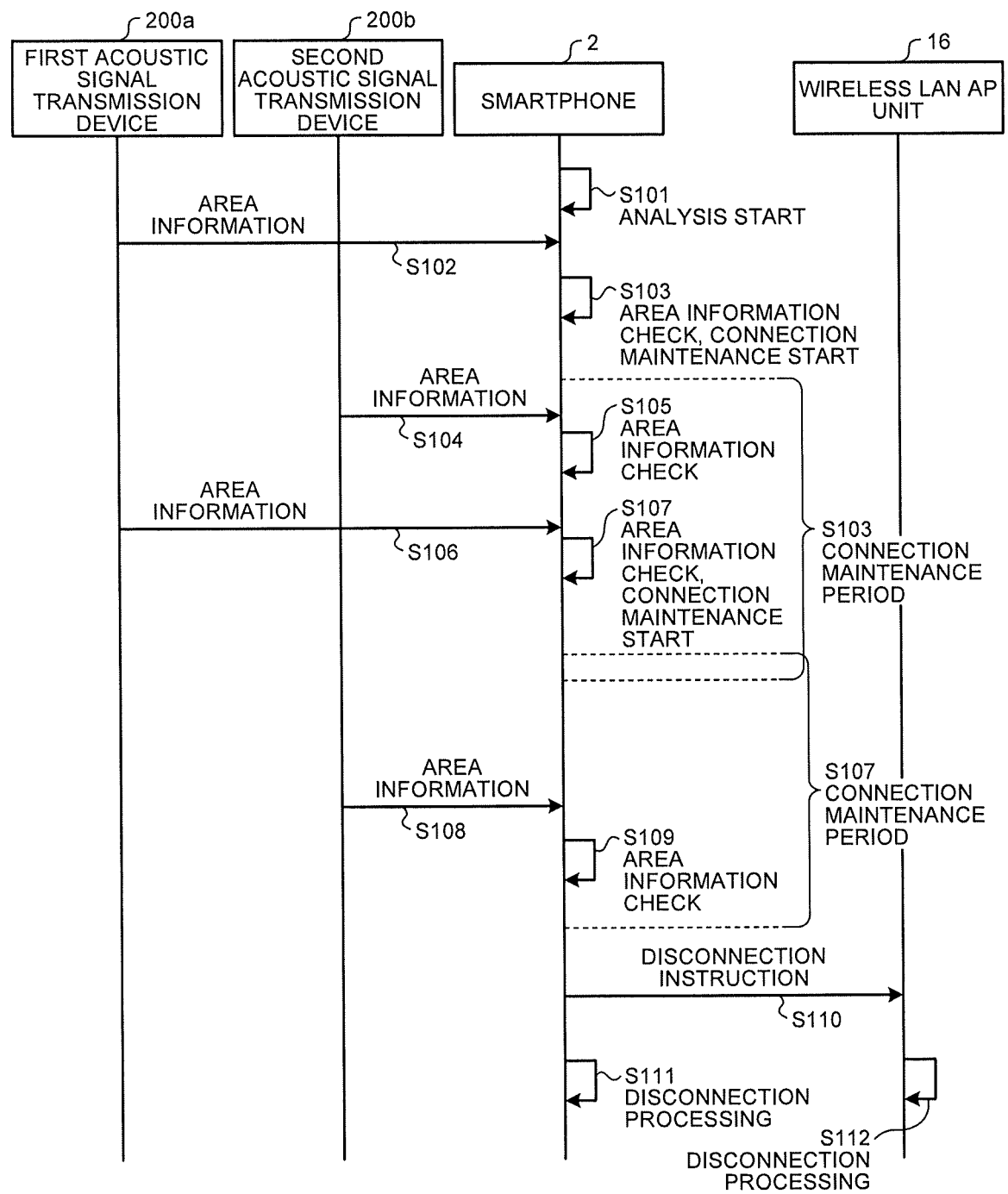
FIG. 24 is a sequence diagram illustrating a process for disconnecting a wireless LAN communication line performed by a wireless LAN communication scheme according to a second embodiment.

FIG. 24 is a sequence diagram illustrating a process for disconnecting the wireless LAN communication line performed by the wireless LAN communication scheme according to the second embodiment. In FIG. 24, when area information transmitted from a first acoustic signal transmission device 200a is an acoustic communication area in which the wireless LAN communication is enabled, indicated by the area information acquired through BLE communication, the smartphone 2 maintains the wireless LAN communication line established as described above (steps from Step S101 to Step S103).

A timer module 164 of the smartphone 2 illustrated in FIG. 16 as an example starts counting the connection-maintained time up to a predetermined period of time to elapse after the time at which the wireless LAN communication line is established. The connection-maintained time is a period of time during which the established wireless LAN communication line is maintained. The peripheral device list described previously stores area information received from the BLE communication unit 17 and area information of the acoustic signal received from the acoustic signal transmission device 200, associated with each device for which the wireless LAN communication line is established.

A comparison module 163 compares during the connection-maintained time area information from the first acoustic signal transmission device 200a acquired by an acoustic signal acquisition module 162 with area information from the acoustic signal transmission device 200 stored in the peripheral device list. When a result of comparison indicating that the area information from the first acoustic signal transmission device 200a acquired by the acoustic signal acquisition module 162 and the area information from the acoustic signal transmission device 200 stored in the peripheral device list are identical to each other is obtained during the connection-maintained time, a wireless LAN communication control module 82 maintains the established wireless LAN communication line for the connection-maintained time.

Assume here that reception of area information transmitted from a second acoustic signal transmission device 200b is also enabled as indicated by Step S104 as a result that the smartphone 2 has moved. In this case, too, the comparison module 163 compares the different pieces of area information described above during the connection-maintained time as indicated by Step S105. When a result of comparison is obtained indicating that the area information from the first acoustic signal transmission device 200a can also be received as yet as indicated by Step S106, the wireless LAN communication control module 82 maintains the established wireless LAN communication line (Step S107). When maintenance of the wireless LAN communication line is confirmed, the timer module 164 resets the count value of the connection-maintained time and starts counting the connection-maintained time again (Step S107).

Assume that the smartphone 2 moves further and, as a result, the area information from the first acoustic signal transmission device 200a can no longer be received during the connection-maintained time, while only the area information from the second acoustic signal transmission device 200b can be received as indicated by Step S108. In this case, the comparison module 163 compares the area information received from the first acoustic signal transmission device 200a, stored in the peripheral device list, with the area information from the second acoustic signal transmission device 200b. The comparison module 163 then outputs a result of comparison indicating that the two pieces of area information are not identical to each other (Step S109).

Additionally, the comparison module 163 continues to determine during the connection-maintained time whether the area information from the first acoustic signal transmission device 200a, used for establishing the wireless LAN communication line, is received. When a result of comparison is obtained indicating that the area information received from the first acoustic signal transmission device 200a and the area information from the second acoustic signal transmission device 200b are not identical to each other, the wireless LAN communication control module 82 waits until a result of comparison is obtained indicating that the area information from the first acoustic signal transmission device 200a is not received during the connection-maintained time. The wireless LAN communication control module 82 then instructs the wireless LAN AP unit 16 to disconnect the wireless LAN communication line (Step S110), thereby performing a process for disconnecting the established wireless LAN communication line (Step S111). The wireless LAN AP unit 16 performs a process for disconnecting the wireless LAN communication line established with the smartphone 2 (Step S112).

As described above, when area information can be received from a plurality of acoustic signal transmission devices while a wireless LAN communication line is being established, the wireless LAN communication scheme according to the second embodiment determines whether the area information received earlier can be received during the connection-maintained time. When the area information received earlier can no longer be received during the connection-maintained time, the wireless LAN communication scheme in the second embodiment performs a process for disconnecting the established wireless LAN communication line.

In this way, the smartphone 2 is capable of maintaining the wireless LAN communication line while the smartphone 2 is located within a range in which wireless LAN communication is enabled by the area information from the acoustic signal transmission device used when the wireless LAN communication line was established. When the smartphone 2 moves out of the range, the smartphone 2 is capable of disconnecting the wireless LAN communication line. These capabilities enable an effective use of an already connected wireless LAN communication line and eliminate the need for performing unnecessary operations of disconnections and reconnections, in addition to achieving effects identical to the effects achieved by the first embodiment.

Third Embodiment

The following describes a wireless LAN communication scheme according to a third embodiment. When area information from a plurality of acoustic signal transmission devices can be received as in the second embodiment described above, the wireless LAN communication scheme according to the third embodiment compares sound pressure of the different pieces of area information during the connection-maintained time mentioned above. When sound pressure of the area information received earlier is found to be lower than sound pressure of the area information received later, the wireless LAN communication scheme in the third embodiment disconnects the wireless LAN communication line established on the basis of the area information received earlier. The third embodiment to be described hereunder differs from each of the first and second embodiments described above in the abovementioned respect only. The following describes this difference only and omits duplicate descriptions.

Figure 25:
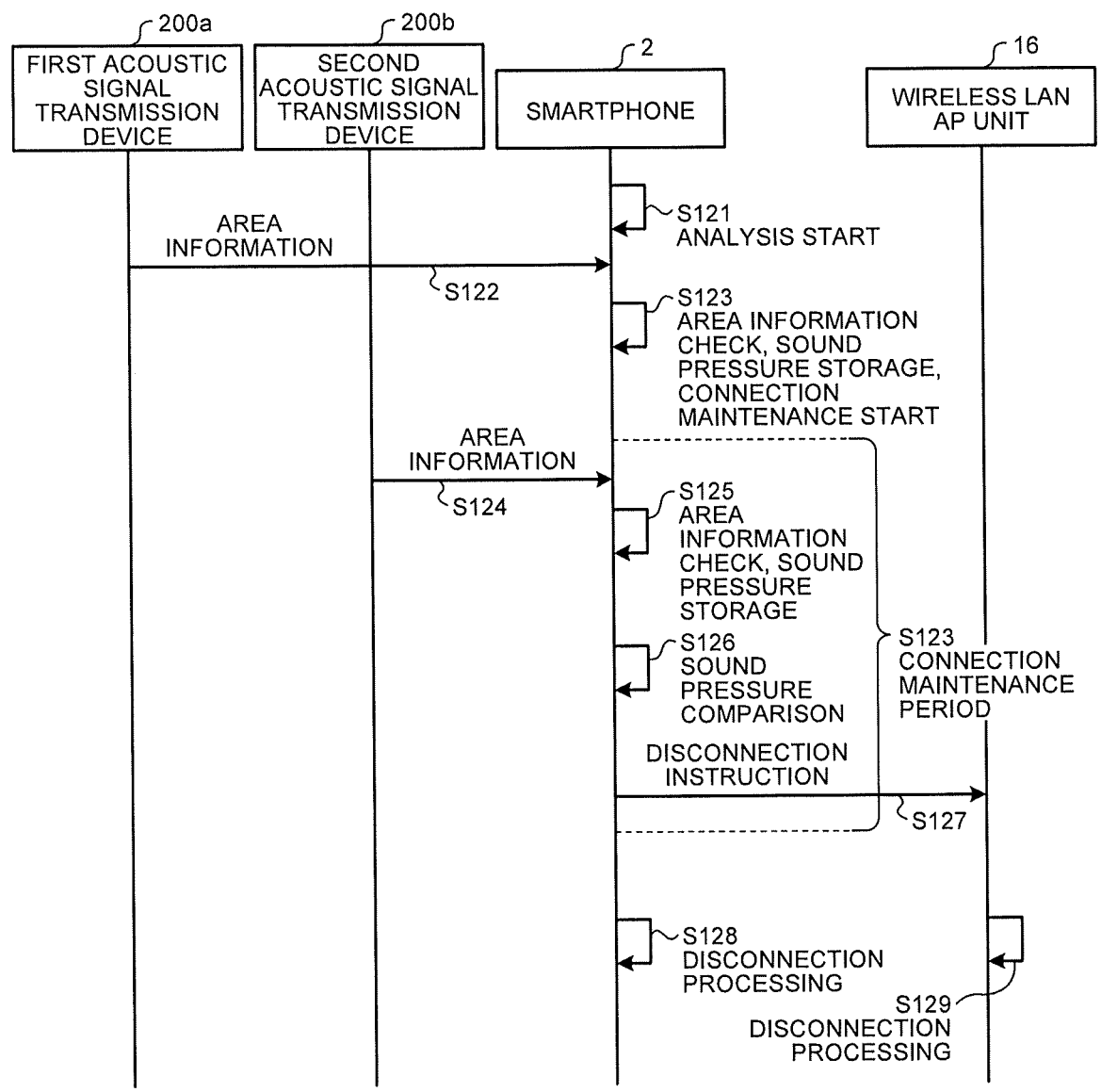
FIG. 25 is a sequence diagram illustrating a process for disconnecting a wireless LAN communication line performed by a wireless LAN communication scheme according to a third embodiment.

FIG. 25 is a sequence diagram illustrating a process for disconnecting a wireless LAN communication line performed by the wireless LAN communication scheme according to the third embodiment. In FIG. 24, when a wireless LAN communication line is established, an acoustic signal acquisition module 162 of a smartphone 2 becomes able to analyze area information transmitted from a first acoustic signal transmission device 200a and other acoustic signal transmission devices as depicted at Step S122 (Step S121). The acoustic signal acquisition module 162 determines whether area information is received from the first acoustic signal transmission device 200a at Step S123. Additionally, when the area information is determined to have been received from the first acoustic signal transmission device 200a, the acoustic signal acquisition module 162 stores, at Step S123, sound pressure information indicating sound pressure of the received area information in a storage, such as a RAM 23. A timer module 164 starts counting the connection-maintained time exemplarily at timing at which reception of the area information from the first acoustic signal transmission device 200a has been confirmed.

When the smartphone 2 moves so as to allow the area information transmitted from a second acoustic signal transmission device 200b to be received as depicted at Step S124, the acoustic signal acquisition module 162 stores in a storage, such as the RAM 23, sound information of the area information received from the second acoustic signal transmission device 200b (Step S125).

A comparison module 163 compares the sound pressure information of the area information from the first acoustic signal transmission device 200a stored in the RAM 23 with the sound pressure information of the area information from the second acoustic signal transmission device 200b (Step S126). Examples of the "sound pressure" to be compared include, but are not limited to, a peak value or a time average value for a predetermined period of time, in addition to amplitude, power spectrum, sound pressure (pascal), and sound pressure level (dB) after the Fourier transform.

When a result of comparison is obtained indicating that the sound pressure of the area information from the first acoustic signal transmission device 200a is higher, a wireless LAN communication control module 82 of the smartphone 2 maintains the wireless LAN communication line. In contrast, when a result of comparison is obtained indicating that the sound pressure of the area information from the first acoustic signal transmission device 200a is lower, the wireless LAN communication control module 82 instructs the wireless LAN AP unit 16 to disconnect the wireless LAN communication line (Step S127). As a result, as depicted at Step S128 and Step S129, the smartphone 2 and the wireless LAN AP unit 16 perform respective processes for disconnecting the established wireless LAN communication line.

The comparison of the sound pressure as described above is made during the connection-maintained time of the wireless LAN communication line. Understandably, a wireless LAN communication line is disconnected, when the area information from the first acoustic signal transmission device 200a used for establishing the wireless LAN communication line cannot be received during the connection-maintained time.

In the present example, a wireless LAN communication line is disconnected even within the connection-maintained time, when a result of comparison is obtained indicating that the sound pressure of the area information from the first acoustic signal transmission device 200a is lower. Nonetheless, when the result of comparison is obtained indicating that the sound pressure of the area information from the first acoustic signal transmission device 200a is lower and when the area information from the first acoustic signal transmission device 200a cannot be obtained within the connection-maintained time, the wireless LAN communication line may be disconnected after the lapse of the connection-maintained time as in the second embodiment described above.

As described above, when a plurality of pieces of area information are detected, the wireless LAN communication scheme according to the third embodiment compares sound pressure information of the area information from the first acoustic signal transmission device 200*a* with sound pressure information of the area information from the second acoustic signal transmission device 200*b*. When the sound pressure of the area information from the first acoustic signal transmission device 200*a* is found to be higher than the sound pressure of the area information from the second acoustic signal transmission device 200*b*, the wireless LAN communication scheme according to the third embodiment maintains the wireless LAN communication line established on the basis of the area information from the first acoustic signal transmission device 200*a*. In contrast, when the sound pressure of the area information from the first acoustic signal transmission device 200*a* is found to be lower than the sound pressure of the area information from the second acoustic signal transmission device 200*b*, the wireless LAN communication scheme according to the third embodiment disconnects the wireless LAN communication line.

The foregoing arrangement allows the established wireless LAN communication line to be disconnected when the smartphone 2 moves from an acoustic communication area in which the wireless LAN communication line has been established to another acoustic communication area. Communication security of the wireless LAN communication scheme can thereby be maintained and the identical effects achieved by each of the first and second embodiments described above can be achieved.

Fourth Embodiment

The following describes a wireless LAN communication scheme according to a fourth embodiment. The wireless LAN communication scheme according to the fourth embodiment changes area information transmitted as an acoustic signal from the acoustic signal transmission device 200 and area information transmitted through BLE communication from the BLE communication unit 17 at predetermined time intervals or at any timing. The fourth embodiment to be described hereunder differs from each of the first to third embodiments described above in the abovementioned respect only. The following describes this difference only and omits duplicate descriptions.

Specifically, in the wireless LAN communication scheme according to the fourth embodiment, the acoustic signal transmission device 200 and the BLE communication unit 17 change at predetermined time intervals or at any timing. The area information changed by the acoustic signal transmission device 200 is acquired by an acoustic signal acquisition module 162 via a microphone unit 25 of a smartphone 2.

Meanwhile, the BLE communication unit 17 also has a wireless LAN communication function and transmits the changed area information to the wireless LAN AP unit 16 through wireless LAN communication. The wireless LAN AP unit 16 transmits the changed area information received from the BLE communication unit 17 to the smartphone 2 through wireless LAN communication. The smartphone 2 acquires the changed area information from the BLE communication unit 17 via a wireless LAN communication unit 31 and a wireless LAN communication control module 82 and stores the changed area information in a storage, such as a RAM 23. The foregoing steps enable analysis of the area information.

A comparison module 163 compares, during the abovementioned connection-maintained time, the changed area information acquired by the acoustic signal acquisition module 162 via the microphone unit 25 with the changed area information notified by the BLE communication unit 17 through wireless LAN communication. When a result of comparison indicating that the two pieces of area information are identical to each other is obtained within the connection-maintained time, the wireless LAN communication control module 82 maintains the established wireless LAN communication line.

In contrast, when a result of comparison indicating that the two pieces of area information are not identical to each other is obtained within the connection-maintained time, the wireless LAN communication control module 82 waits until the connection-maintained time elapses, and then instructs the wireless LAN AP unit 16 to disconnect the established wireless LAN communication line and performs a process for disconnecting the established wireless LAN communication line, as in the second embodiment described above. Meanwhile, the wireless LAN AP unit 16 performs a process for disconnecting the wireless LAN communication line established with the smartphone 2.

The two pieces of changed area information not being identical to each other means that the smartphone 2 has moved to another acoustic area, or that a wireless LAN communication line has been established using illegally acquired area information. Thus, when the pieces of changed area information are not identical to each other, a process is performed to disconnect the established wireless LAN communication line to thereby further enhance communication security. Additionally, the effects achieved by each of the first to third embodiments described above can be achieved.

Fifth Embodiment

The following describes a wireless LAN communication scheme according to a fifth embodiment. In each of the first to fourth embodiments described above, the BLE communication unit 17 is, when BLE communication is enabled with a device, such as the smartphone 2, to transmit area information and setup information to the device. In contrast, in the wireless LAN communication scheme according to the fifth embodiment, the BLE communication unit 17 acquires area information of the acoustic communication area in which the smartphone 2 is currently located. When area information distributed through BLE communication is identical to the area information acquired from the device, the BLE communication unit 17 distributes setup information to the device. The fourth embodiment to be described hereunder differs from each of the first to fourth embodiments described above in the abovementioned respect only. The following describes this difference only and omits duplicate descriptions.

Figure 26:
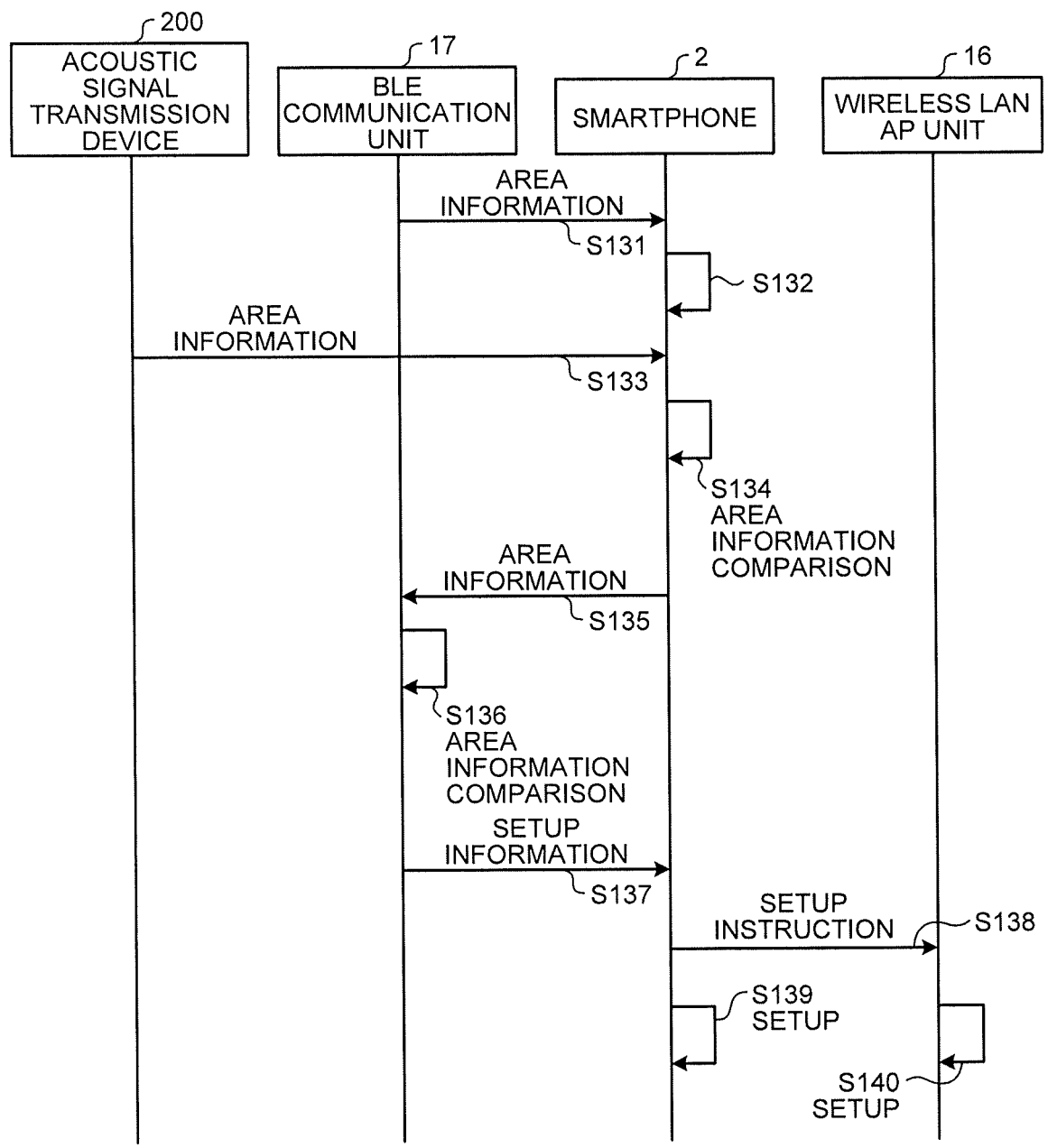
FIG. 26 is a sequence diagram illustrating a process for setting up a wireless LAN communication line performed by a wireless LAN communication scheme according to a fifth embodiment.

FIG. 26 is a sequence diagram illustrating a process for setting up a wireless LAN communication line performed by the wireless LAN communication scheme according to the fifth embodiment. In FIG. 26, a BLE information acquisition module 161 of the smartphone 2 receives, at Step S131, area information that indicates an acoustic communication area in which use of a wireless LAN communication line is enabled through BLE communication from the BLE communication unit 17. A storage control module 165 stores the received area information in a storage such as the RAM 23 at Step S132.

Meanwhile, the smartphone 2 receives, at Step S133, area information that has transmitted from the acoustic signal transmission device 200 and that indicates an acoustic communication area in which use of a wireless LAN communication line is enabled. A storage control module 165 stores the received area information in a storage such as the RAM 23.

A comparison module 163 of the smartphone 2 compares at Step S134 the area information received through the BLE communication with the area information received as an acoustic signal. When the smartphone 2 is located within a specified acoustic communication area, the comparison will yield a result that indicates that the two pieces of area information are identical to each other. When the smartphone 2 is located outside the specified acoustic communication area or illegally acquired area information is used, the comparison will yield a result that indicates that the two pieces of area information are not identical to each other.

When the result of comparison indicating that the two pieces of area information are identical to each other is obtained, a BLE communication control module 83 (an exemplary return module) of the smartphone 2 returns the area information received through BLE communication to the BLE communication unit 17 (an exemplary communication device) through BLE communication (Step S135). The BLE communication unit 17 compares the area information that is transmitted from the communication range limiting device to, for example, the smartphone 2 with the area information returned from the smartphone 2 (Step S136).

When a result of comparison is obtained indicating that the area information transmitted from the communication range limiting device and the area information returned from the smartphone 2 are identical to each other, the result means that the smartphone 2 is located within the specified acoustic communication area and that the smartphone 2 retains the authorized area information transmitted from the BLE communication unit 17. Thus, when the result of comparison is obtained indicating that the area information transmitted from the communication range limiting device and the area information returned from the smartphone 2 are identical to each other, the BLE communication unit 17 transmits setup information for the wireless LAN communication line to the smartphone 2 through BLE communication (Step S137).

The smartphone 2 instructs the wireless LAN AP unit 16 to perform a setup process using the setup information (Step S138). This step causes the smartphone 2 and the wireless LAN AP unit 16 to perform a setup process for the wireless LAN communication line (Step S139 and Step S140).

As described above, the distribution of the setup information for the wireless LAN communication line to the smartphone 2 is based on the confirmation that the smartphone 2 is located within the specified acoustic communication area. This approach further enhances communication security and achieves the effects identical to the effects achieved by each of the first through fourth embodiments.

The present invention can provide the advantageous effect of limiting the communication range to an intended range to thereby achieve enhanced communication security.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication device comprising:
   a first communication interface configured to perform communication in accordance with a first communication scheme;
   a second communication interface configured to perform communication in accordance with a second communication scheme that is different from the first communication scheme; and
   processing circuitry configured to
     acquire, through communication in accordance with the second communication scheme, first area information that indicates an area in which communication in accordance with the first communication scheme is enabled in a first communication area in which communication in accordance with the first communication scheme is performed,
     acquire second area information that indicates an area in which communication in accordance with the first communication scheme is only enabled in an acoustic communication area which is smaller than the first communication area, the second area information being an acoustic signal, that is different than the first communication scheme and the second communication scheme, and that is output continuously or intermittently in the acoustic communication area,
compare the first area information with the second area information to determine whether a current position is within the area indicated by the first area information, and
when the current position is determined to be within the area indicated by the first area information, perform a setup process for establishing a communication line in accordance with the first communication scheme using setup information for establishing the communication line in accordance with the first communication scheme,
the processing circuitry being configured to perform a process for disconnecting a communication line in accordance with the first communication scheme, by directly transmitting a disconnection instruction to an access point of the first communication scheme, when a predetermined period of time lasts during which the second area information as the acoustic signal fails to be acquired, based on the communication device having moved out of the acoustic communication area of the acoustic signal and while still being within the first communication area, after the communication line in accordance with the first communication scheme has been established.

2. The communication device according to claim 1, wherein the processing circuitry is configured to acquire the setup information through communication in accordance with the second communication scheme when the comparator determines that the current position is within the area indicated by the first area information.

3. The communication device according to claim 2, wherein
the first area information and the setup information are transmitted collectively,
the processing circuitry acquires the first area information that is transmitted collectively with the setup information, and
the processing circuitry acquires the setup information that is transmitted collectively with the first area information.

4. The communication device according to claim 2, wherein
the processing circuitry acquires the first area information or the setup information in an area in which communication in accordance with the second communication scheme is performed, the area overlapping in part or in whole the area indicated by the second area information.

5. The communication device according to claim 1, wherein
the second area information is an acoustic signal that indicates a specific area in which communication in accordance with the first communication scheme is enabled, among a plurality of different acoustic communication areas disposed in the first communication area, and
the second acquirer acquires the second area information delivered in the acoustic communication area to which the communication device moves.

6. The communication device according to claim 1, wherein the processing circuitry being configured to perform a process for disconnecting a communication line in accordance with the first communication scheme when a comparison result indicating acquisition of different pieces of the second area information is obtained.

7. The communication device according to claim 1, further comprising:
a memory configured to store communication information enabling communication in accordance with the first communication scheme or the second communication scheme between devices that are capable of communication in accordance with the first communication scheme and the second communication scheme in the acoustic communication area, wherein
the first communication interface or the second communication interface performs communication in accordance with the first communication scheme or the second communication scheme with each of the devices in the acoustic communication area using the communication information stored in the communication information memory.

8. The communication device according to claim 1, wherein the processing circuitry maintains the established communication line in accordance with the first communication scheme when a plurality of pieces of the second area information are receivable and when the second area information received earlier is receivable within a predetermined period of time, and
the processing circuitry disconnects the established communication line in accordance with the first communication scheme when a plurality of pieces of the second area information are receivable and when the second area information received earlier is not receivable within the predetermined period of time.

9. The communication device according to claim 6, wherein
the processing circuitry maintains the established communication line in accordance with the first communication scheme when a plurality of pieces of the second area information are receivable and when the second area information received earlier is receivable within a predetermined period of time, and
the processing circuitry disconnects the established communication line in accordance with the first communication scheme when a plurality of pieces of the second area information are receivable and when the second area information received earlier is not receivable within the predetermined period of time.

10. The communication device according to claim 7, wherein
the processing circuitry maintains the established communication line in accordance with the first communication scheme when a plurality of pieces of the second area information are receivable and when the second area information received earlier is receivable within a predetermined period of time, and
the processing circuitry disconnects the established communication line in accordance with the first communication scheme when a plurality of pieces of the second area information are receivable and when the second area information received earlier is not receivable within the predetermined period of time.

11. The communication device according to claim 1, wherein the processing circuitry compares sound pressure of the pieces of the second area information when a plurality of pieces of the second area information are receivable,
the processing circuitry maintains the established communication line in accordance with the first communication scheme when sound pressure of the second area information received earlier is higher than sound pressure of the second area information received later, and the processing circuitry disconnects the established communication line in accordance with the first communication scheme when the sound pressure of the second area information received earlier is lower than the sound pressure of the second area information received later.

12. The communication device according to claim 6, wherein the processing circuitry compares sound pressure of the pieces of the second area information when a plurality of pieces of the second area information are receivable, the processing circuitry maintains the established communication line in accordance with the first communication scheme when sound pressure of the second area information received earlier is higher than sound pressure of the second area information received later, and the processing circuitry disconnects the established communication line in accordance with the first communication scheme when the sound pressure of the second area information received earlier is lower than the sound pressure of the second area information received later.

13. The communication device according to claim 7, wherein the processing circuitry compares sound pressure of the pieces of the second area information when a plurality of pieces of the second area information are receivable, the processing circuitry maintains the established communication line in accordance with the first communication scheme when sound pressure of the second area information received earlier is higher than sound pressure of the second area information received later, and the processing circuitry disconnects the established communication line in accordance with the first communication scheme when the sound pressure of the second area information received earlier is lower than the sound pressure of the second area information received later.

14. The communication device according to claim 1, wherein the first area information and the second area information are changed and transmitted at predetermined time intervals or at any timing, and the processing circuitry is configured to acquire, through communication in accordance with the first communication scheme, changed first area information changed after the communication line in accordance with the first communication scheme has been established, acquire changed second area information, and compare the changed first area information with the changed second area information to determine whether the changed first area information and second area information are identical to each other, the first communication interface maintains the established communication line in accordance with the first communication scheme when a comparison result is obtained indicating that the changed first area information and second area information are identical to each other, and the processing circuitry disconnects the established communication line in accordance with the first communication scheme when a comparison result is obtained indicating that the changed first area information and second area information are not identical to each other.

15. The communication device according to claim 6, wherein the first area information and the second area information are changed and transmitted at predetermined time intervals or at any timing, and the processing circuitry is configured to acquire, through communication in accordance with the first communication scheme, changed first area information changed after the communication line in accordance with the first communication scheme has been established, acquire changed second area information, and compare the changed first area information with the changed second area information to determine whether the changed first area information and second area information are identical to each other, the first communication interface maintains the established communication line in accordance with the first communication scheme when a comparison result is obtained indicating that the changed first area information and second area information are identical to each other, and the processing circuitry disconnects the established communication line in accordance with the first communication scheme when a comparison result is obtained indicating that the changed first area information and second area information are not identical to each other.

16. The communication device according to claim 7, wherein the first area information and the second area information are changed and transmitted at predetermined time intervals or at any timing, and the processing circuitry is configured to acquire, through communication in accordance with the first communication scheme, changed first area information changed after the communication line in accordance with the first communication scheme has been established, acquire changed second area information, and compare the changed first area information with the changed second area information to determine whether the changed first area information and second area information are identical to each other, the first communication interface maintains the established communication line in accordance with the first communication scheme when a comparison result is obtained indicating that the changed first area information and second area information are identical to each other, and the processing circuitry disconnects the established communication line in accordance with the first communication scheme when a comparison result is obtained indicating that the changed first area information and second area information are not identical to each other.

17. The communication device according to claim 1, further comprising:

the processing circuitry is configured to return the first area information to a communication device that performs communication in accordance with the second communication scheme when the first area information and the second area information are compared with each other and a comparison result is obtained indicating that the first area information and the second area information indicate an identical area, wherein the processing circuitry performs a setup process for establishing the communication line in accordance with the first communication scheme using the setup information transmitted from the communication device when, in the communication device, the first area information transmitted from the communication device is compared with the first area information returned and a comparison result is obtained indicating that the two pieces of first area information are identical area information.

18. A communication method, implemented by processing circuitry of a communication device, comprising:

acquiring, through communication in accordance with a second communication scheme, first area information that indicates an area in which communication in accordance with a first communication scheme is enabled in a first communication area in which communication in accordance with the first communication scheme is performed;

acquiring second area information that indicates an area in which communication in accordance with the first communication scheme is only enabled in an acoustic communication area which is smaller than the first communication area, the second area information being an acoustic signal, that is different than the first communication scheme and the second communication scheme, and that is output continuously or intermittently in the acoustic communication area;

comparing the first area information with the second area information to determine whether a current position is within the area indicated by the first area information;

performing, when the current position is determined to be within the area indicated by the first area information, a setup process for establishing a communication line in accordance with the first communication scheme using setup information for establishing the communication line in accordance with the first communication scheme; and performing a process for disconnecting a communication line in accordance with the first communication scheme, by directly transmitting a disconnection instruction to an access point of the first communication scheme, when a predetermined period of time lasts during which the second area information as the acoustic signal fails to be acquired, based on the communication device having moved out of the acoustic communication area of the acoustic signal and while still being within the first communication area, after the communication line in accordance with the first communication scheme has been established.

19. A non-transitory computer-readable recording medium with an executable program stored thereon, wherein the program instructs a computer to perform:

acquiring, through communication in accordance with a second communication scheme, first area information that indicates an area in which communication in accordance with a first communication scheme is enabled in a first communication area in which communication in accordance with the first communication scheme is performed;

acquiring second area information that indicates an area in which communication in accordance with the first communication scheme is only enabled in an acoustic communication area which is smaller than the first communication area, the second area information being an acoustic signal, that is different than the first communication scheme and the second communication scheme, and that is output continuously or intermittently in the acoustic communication area;

comparing the first area information with the second area information to determine whether a current position is within the area indicated by the first area information; and performing, when the current position is determined to be within the area indicated by the first area information, a setup process for establishing a communication line in accordance with the first communication scheme using setup information for establishing the communication line in accordance with the first communication scheme; and performing a process for disconnecting a communication line in accordance with the first communication scheme, by directly transmitting a disconnection instruction to an access point of the first communication scheme, when a predetermined period of time lasts during which the second area information as the acoustic signal fails to be acquired, based on the communication device having moved out of the acoustic communication area of the acoustic signal and while still being within the first communication area, after the communication line in accordance with the first communication scheme has been established.

* * * * *